United States Patent
Hsu

(10) Patent No.: US 9,078,319 B2
(45) Date of Patent: Jul. 7, 2015

(54) CONVERSION CONTROL CIRCUIT AND CONVERTER THEREOF

(75) Inventor: Ta-Ching Hsu, Taipei (TW)

(73) Assignee: NIKO SEMICONDUCTOR CO., LTD., New Taipei (TW)

( * ) Notice: Subject to any disclaimer, the term of this patent is extended or adjusted under 35 U.S.C. 154(b) by 607 days.

(21) Appl. No.: 13/543,881

(22) Filed: Jul. 8, 2012

(65) Prior Publication Data

US 2013/0187566 A1     Jul. 25, 2013

(30) Foreign Application Priority Data

Jan. 19, 2012 (CN) .......................... 2012 1 0016343

(51) Int. Cl.
*H02M 3/156* (2006.01)
*H02M 3/157* (2006.01)
*H02M 3/158* (2006.01)
*H05B 33/08* (2006.01)
*H02M 3/155* (2006.01)

(52) U.S. Cl.
CPC ........... *H05B 33/0818* (2013.01); *H02M 3/155* (2013.01); *Y02B 20/346* (2013.01)

(58) Field of Classification Search
None
See application file for complete search history.

(56) References Cited

U.S. PATENT DOCUMENTS 7,250,810 B1 * 7/2007 Tsen .............................. 327/536
2005/0116697 A1 6/2005 Matsuo et al.

FOREIGN PATENT DOCUMENTS

| CN | 101540555 A | 9/2009 |
|---|---|---|
| CN | 101873736 A | 10/2010 |
| TW | 200901829 | 1/2009 |
| TW | 200929818 | 7/2009 |
| TW | 201318481 A1 | 5/2013 |

OTHER PUBLICATIONS

Yan, Zhong-Guang, "Power Application Design of LED Lighting of BP2808", p. 73 chapter 3, China Integrated Circuit (CIC), 2010, 13520100831, Aug. 31, 2010.

* cited by examiner

*Primary Examiner* — Douglas W Owens
*Assistant Examiner* — Dedei K Hammond
(74) *Attorney, Agent, or Firm* — Li & Cai Intellectual Property (USA) Office

(57) ABSTRACT

A conversion control circuit for controlling the operation of a power transistor is disclosed. The conversion control circuit includes a voltage-regulating switch and a control unit. One end of the voltage-regulating switch connects to an external voltage input terminal while another end connects to a voltage-regulating capacitor. The conversion control circuit converts an input voltage inputted from the external voltage input terminal into a power voltage. The power voltage is for supplying operating power to the conversion control circuit. The control unit receives a feedback voltage signal to generate a voltage-regulating pulse signal and a turn-on pulse signal, which are used for controlling the operations of the voltage-regulating switch and the power transistor, respectively and for defining a charging period for charging the voltage-regulating capacitor. A converter including the described conversion control circuit is also disclosed.

24 Claims, 20 Drawing Sheets

CONVERSION CONTROL CIRCUIT AND CONVERTER THEREOF

BACKGROUND OF THE INVENTION

1. Field of the Invention

The present invention relates to a conversion control circuit and a converter thereof; in particular, to a conversion control circuit with a built-in voltage-regulating circuit and a converter thereof.

2. Description of Related Art

Recently, because of the circuit simplicity, fewer components, and low cost, the non-isolated converter is widely used in the light emitting diode (LED) illumination markets.

FIG. 1 is a circuit diagram of the LED driving chip HV9910 generated by the American SUPERTEX company. A buck converter is shown in FIG. 1. The buck converter has a conversion control circuit 10a (i.e, the chip HV9910), an inductor L0, a diode D0, a power transistor Q0, and a current detection resistor R0. When the power transistor Q0 is turned on, the power provided by the voltage input terminal VIN may be supplied to the inductor L0 and an LED lamp string 20. When the power transistor Q0 is turned off, the power stored in the inductor L0 may be provided in form of current to the LED lamp string 20 which makes the LED lamp string 20 emitting light continuously. The conversion control circuit 10a controls the operation of the power transistor Q0 according to a feedback voltage signal Vcs from the current detection resistor R0, stabilizing the current flowing through the LED lamp string 20.

The conversion control circuit 10a directly connects to the voltage input terminal VIN for acquiring the requisite operating power. As shown in FIG. 1, the input voltage of the voltage input terminal VIN is converted into a power voltage VDD (which has the 7.5V power voltage) through the linear voltage-regulating circuit 11 of the conversion control circuit 10a, for providing the requisite working power to the conversion control circuit 10a. After the conversion control circuit 10a acquires enough power voltage VDD and starts to operate, the oscillator 12 then outputs a turn-on pulse to the input terminal S of the SR flip-flop 13, which makes the output terminal Q of the SR flip-flop 13 outputting a high voltage level signal turning on the external power transistor Q0.

When the power transistor Q0 is turned on, the current flows from the voltage input terminal VIN through the inductor L0, the LED lamp string 20, the power transistor Q0, and the current detection resistor R0 to the ground. Along with gradually increasing of current, as voltage level of the higher voltage end of the current detection resistor R0 reaches the reference voltage Vr0 (such as 250 mV), the comparator COMP0 outputs a high voltage level signal, to have the output terminal Q of the SR flip-flop 13 outputting a low voltage level signal turned off the power transistor Q0.

The inductor L0 may store the energy during the conducting period of the external-connected power transistor Q0, and may release the energy when the external power transistor Q0 is turned off. The released energy is a current which flows from the inductor L0 through the LED lamp string 20 and the diode D0 back to the inductor L0, until the oscillator 12 generates the next turn-on pulse to have the external power transistor Q0 turned on again. When the current flowing through the power transistor Q0 causing the voltage value of the higher voltage end of the resistor R0 reaching the reference voltage Vr0, the external power transistor Q0 may be turned off again, and the cyclic operations are repeated.

As described above, the LED driving chip HV9910 uses built-in linear voltage-regulation to regulate the voltage, and the power consumption during the processes may be represented as following functions:

$$\text{Power consumption}(Pd) = (Vin - VDD) \times IDD \quad (1)$$

Vin is the input voltage of the voltage input terminal VIN, VDD is power voltage, and IDD is the current for generating the power voltage VDD. According to the spec of the LED driving chip HV9910: VDD=7.5V, IDD=1 mA, and Vin=264×1.414=373V. The values are involved into the function (1), and the calculated power consumption (Pd)=(373−7.5)×1×10$^{-3}$=0.37 (W).

According to the above calculation result, in application of high AC input voltage, the power consumption may be 0.37 W. To the LED lamp with 3 W output power, the ratio of power consumption is about 12.33% causing the converter to have low efficiency.

FIG. 2 shows a circuit diagram of the LED driving chip BP2808 generated by the Shang-Hai BPS company. As shown in FIG. 2, the conversion control circuit 10b (which is the chip BP2808) of the converter has an internal low-voltage transistor QL which is series-connected to the external-connected power transistor Q0. By controlling the operation of the internal low-voltage transistor QL of the conversion control circuit 10b, the operation of the external-connected power transistor Q0 may be synchronously controlled.

Different from the chip HV9910 which generates the turn-on pulse with constant frequency, the conversion control circuit 10b generates the turn-on pulse with constant off time. That is, when the cut-off time reaches a predetermined time length, the control unit 15 generates the turn-on pulse to turn on the low-voltage transistor QL, pulling down the voltage level of the source node of the power transistor Q0, for making the power transistor Q0 turn on. At the moment, the current starts to flow from the voltage input terminal VIN through the inductor L0, the LED lamp string 20, the power transistor Q0, the low-voltage transistor QL, and the current detection resistor R0 to the ground. When the current makes the voltage level of the higher voltage end of the current detection resistor R0 increase to the reference voltage, the control unit 15 then turns off the internal low-voltage transistor QL and the external-connected power transistor Q0. The cyclic operations are repeated.

The converter uses a voltage-regulating diode Z0 for converting the power transmitted from the voltage input terminal VIN into the power voltage VDD for providing the requisite operating power to the conversion control circuit 10b. The present converter is different from the chip HV9910 which uses the linear voltage-regulating circuit 11 within the conversion control circuit 10a for converting the input voltage of the voltage input terminal VIN into the power voltage VDD.

Thus, the chip BP2808 uses external components which are combined into a linear voltage regulator. The power consumption during the processes may be represented as following functions:

$$\text{Power consumption}(Pd) = (Vin - VLED - VDD) \times (IDD + IZK) \quad (2)$$

Vin is the input voltage of the voltage input terminal VIN, VLED is the voltage drop of the LED lamp string 20, VDD is the power voltage, IDD is the current for generating the power voltage VDD, and IZK is the current flowing through the voltage-regulating diode Z0. According to the spec of the chip BP2808: VDD=12V, IDD=0.2 mA, Vin=264×1.414=373V, VLED=10V, and IZK=1A. The values are substituted into the function (2) for calculating the power consumption (Pd)=(373−10−12)×1.2×10$^{-3}$=0.42 (W).

FIG. 3 shows a circuit diagram of the LED driving chip GR8210 generated by the Taiwan GRENERGY company.

Excepting for the voltage-regulating manner is different from the chip BP2808, the remaining operations of the chip GR8210 are essentially the same as those of the chip BP2808.

The presented chip uses the internal low voltage linear voltage-regulation method regulating the power, instead of using external-connected linear voltage regulator. As shown in FIG. 3, the conversion control circuit 10c has a built-in low voltage linear voltage-regulating circuit 14. One end of the linear voltage-regulating circuit 14 is connected to the source of the power transistor Q0 while the other end thereof is connected to an external-connected capacitor C0, for generating the power voltage VDD. When the control unit 15 controls the internal low-voltage transistor QL to turn off, the low voltage linear voltage-regulating circuit 14 may generate a charging current for charging the external capacitor C0. At the moment, the power transistor Q0 is at the status of semi-conducting and has high resistance property. That is, the power transistor Q0 provides the requisite operating current to the low voltage linear voltage-regulating circuit 14 for generating the power voltage VDD by suffering the high voltage status.

The chip GR8210 uses built-in low voltage linear voltage-regulating for regulating voltages, and the power consumption during the processes may be represented by the following functions:

$$\text{Power consumption}(Pd) = (Vin + VD - VDD) \times IDD \quad (3)$$

Vin is the input voltage of the voltage input terminal VIN, VD is the voltage drop of the diode, VDD is the power voltage, and the IDD is the current for generating power voltage VDD. According to the spec of the chip GR8210: VDD=5V, IDD=0.9 mA, and Vin=264×1.414=373V. The values are substituted into the function (3) for calculating the power consumption $(Pd)=(373+0.7-5)\times(0.9)\times 10^{-3}=0.33$ (W).

On the basis of the above, because the high voltage linear voltage regulator is built-in, the linear conduction loss of the LED driving chip HV9910 during the processes of voltage-regulating is directly generated within the chip, which may easily cause temperature increasing. The LED driving chip BP2808 uses external resistor and voltage-regulating diode which are combined into a linear voltage regulator for carrying a great part of linear conduction loss, which may reduce the temperature of the controller. However, in the aspect of overall efficiency of the power voltage-regulating, the problem of high power consumption may not be improved regardless whether the voltage regulator is built-in or external-connected.

SUMMARY OF THE INVENTION

The present invention provides a conversion control circuit and a voltage-regulating converter which may greatly reduce the loss of the voltage-regulating processes for providing necessary operating power to the control circuit, and for further increasing the conversion efficiency.

A conversion control circuit is provided according to an embodiment of the present invention, for controlling the operation operations of a power transistor. The conversion control circuit includes a voltage-regulating switch and a control unit. One end of the voltage-regulating switch is connected to an external voltage input terminal, while another end thereof is connected to a voltage-regulating capacitor. The voltage-regulating switch is for converting an input voltage inputted from the external voltage input terminal into a power voltage. The power voltage is for providing the operating power to the conversion control circuit. The control unit receives a feedback voltage signal to generate a voltage-regulating pulse signal and a turn-on pulse signal to respectively control the operations of the voltage-regulating switch and the power transistor and for defining a charging period of the voltage-regulating capacitor being charged by the external voltage input terminal.

In other words, the present invention provides a conversion control circuit for controlling the operation of the power transistor. The conversion control circuit includes a voltage-regulating switch having one end thereof connecting to an external voltage input terminal and another end thereof connecting to a voltage-regulating capacitor. The conversion control circuit is for converting an input voltage inputted from the external voltage input terminal into a power voltage so as to provide the operating power to the conversion control circuit. The conversion control circuit further has a control unit for generating a voltage-regulating pulse signal and a turn-on pulse signal, for respectively control the operations of the voltage-regulating switch and the power transistor, and for defining a charging period of the voltage-regulating capacitor being charged by the external voltage input terminal.

In an embodiment of the present invention, a starting time of the charging period is the same as or later than a pulse cut-off time of the turn-on pulse signal.

In an embodiment of the present invention, a cut-off time of the charging period is the same as or later than a pulse starting time of the turn-on pulse signal.

In an embodiment of the present invention, when a voltage value of the power voltage is higher than a predetermined voltage, the conversion control circuit stops charging the voltage-regulating capacitor.

In an embodiment of the present invention, the mentioned external voltage input terminal is the drain of the power transistor. In another embodiment of the present invention, the external voltage input terminal is the source of the power transistor.

In an embodiment of the present invention, the conversion control circuit has a low-voltage transistor which is series-connected between a source of the power transistor and a ground. The turn-on pulse signal generated by the control unit controls the conducting operation of the power transistor to turn on by conducting the low-voltage transistor.

In an embodiment of the present invention, the control unit has a delay circuit for receiving the turn-on pulse signal and generating a voltage-regulating pulse signal. In this embodiment, a pulse starting time of the voltage-regulating pulse signal is the same as a pulse starting time of the turn-on pulse signal, and a pulse cut-off time of the voltage-regulating pulse signal is later than a pulse cut-off time of the turn-on pulse signal.

In an embodiment of the present invention, a pulse starting time of the turn-on pulse signal is earlier than a pulse starting time of the voltage-regulating pulse signal, and the pulse duration of the voltage-regulating pulse signal is the same as the pulse duration of the turn-on pulse signal.

In an embodiment of the present invention, the turn-on pulse signal is complementary to the voltage-regulating pulse signal.

In an embodiment of the present invention, the conversion control circuit further includes a power voltage detection circuit which is coupled to the voltage-regulating capacitor. The power voltage detection circuit is for detecting a voltage value of the power voltage and for controlling the cut-off time of the charging period of the voltage-regulation capacitor.

According to the described conversion control circuit, a converter is disclosed according to another embodiment of the present invention. The converter has a power transistor and a conversion control circuit. The power transistor is coupled to an LED lamp string and is for controlling the current flowing through the LED lamp string. The conversion control circuit is for controlling the operation of the power transistor. The conversion control circuit includes a voltage-regulating switch and a control unit. One end of the voltage-regulating switch is connected to an external voltage input terminal, and another end thereof is connected to a voltage-regulating capacitor. The voltage-regulating switch is for converting an input voltage of the external voltage input terminal into a power voltage which provides operating power to the control circuit. The control unit receives a feedback voltage signal for generating a voltage-regulating pulse signal and a turn-on pulse signal, to respectively control the operations of the voltage-regulating switch and the power transistor and for defining a charging period of the voltage-regulating capacitor being charged by the external voltage input terminal.

That is, the present invention also discloses a converter including a power transistor which is coupled between an LED lamp string and a ground, and a conversion control circuit for controlling the operation of the power transistor. The conversion control circuit has a voltage-regulating switch of which one end thereof connecting to an external voltage input terminal and another end thereof connecting to a voltage-regulating capacitor so as to convert an input voltage of the external voltage input terminal into a power voltage to provide the requisite operating power to the conversion control circuit, and a control unit for generating a voltage-regulating pulse signal and a turn-on pulse signal, to respectively control the operations of the voltage-regulating switch and the power transistor, and for defining a charging period of the voltage-regulating capacitor being charged by the external voltage input terminal.

The conversion control circuit and the switching voltage-regulating converter disclosed by the present invention may have the efficacies of improving the problem of the large voltage-regulation consumptions, thereby increasing the total conversion efficiency, and reducing the temperature of the driving chip.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

Figure 1:
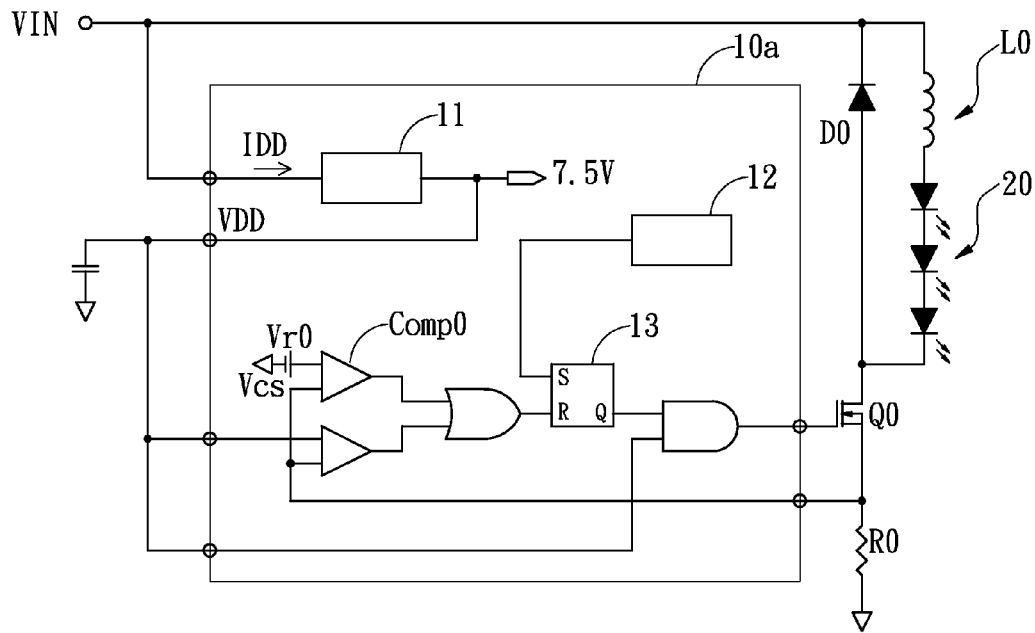
FIG. 1 shows a circuit diagram of the LED driving chip HV9910 manufactured by the American SUPERTEX company.
Figure 2:
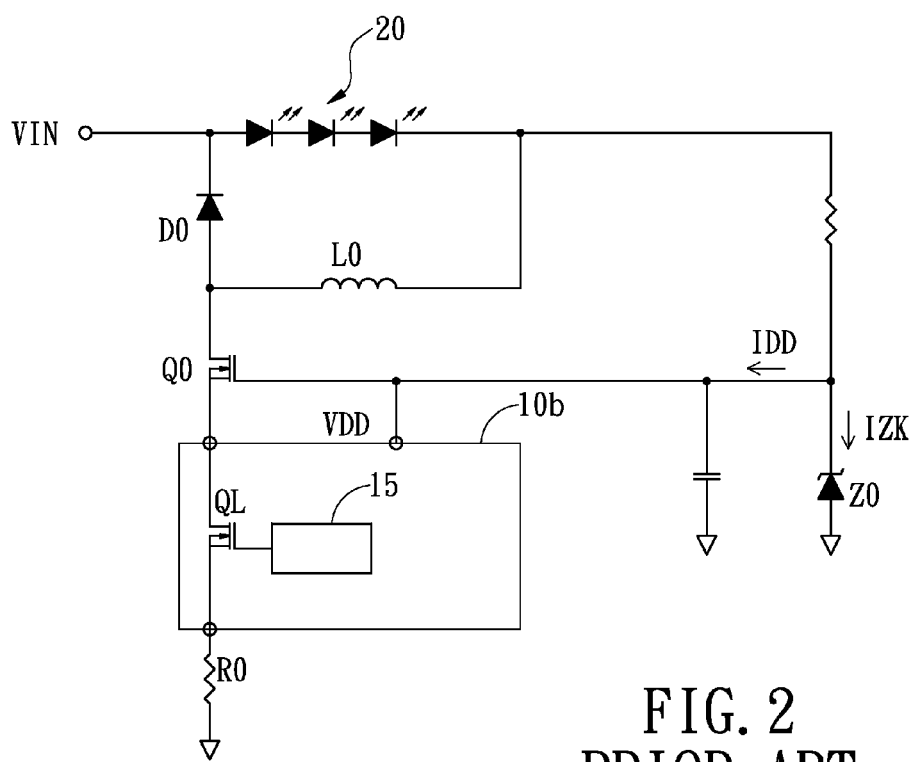
FIG. 2 shows a circuit diagram of the LED driving chip BP2808 manufactured by the Shang-Hai BPS company.
Figure 3:
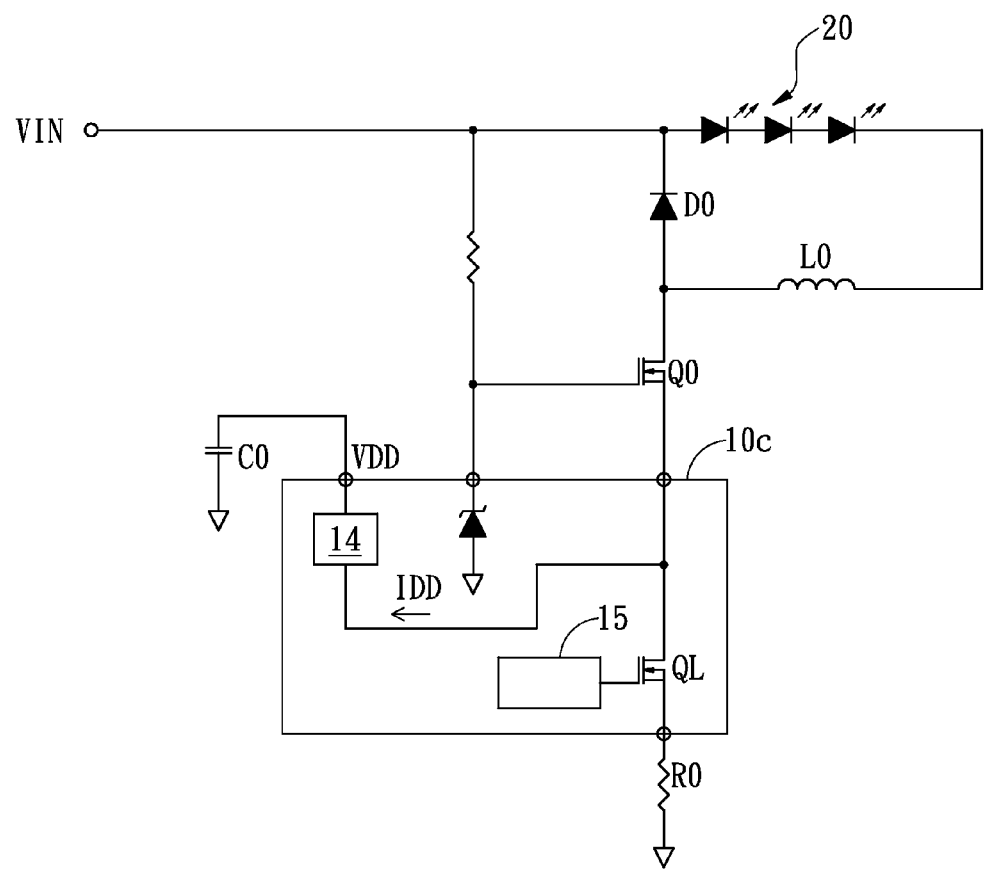
FIG. 3 shows a circuit diagram of the LED driving chip GR8210 manufactured by the Taiwan GRENERGY company.
Figure 4:
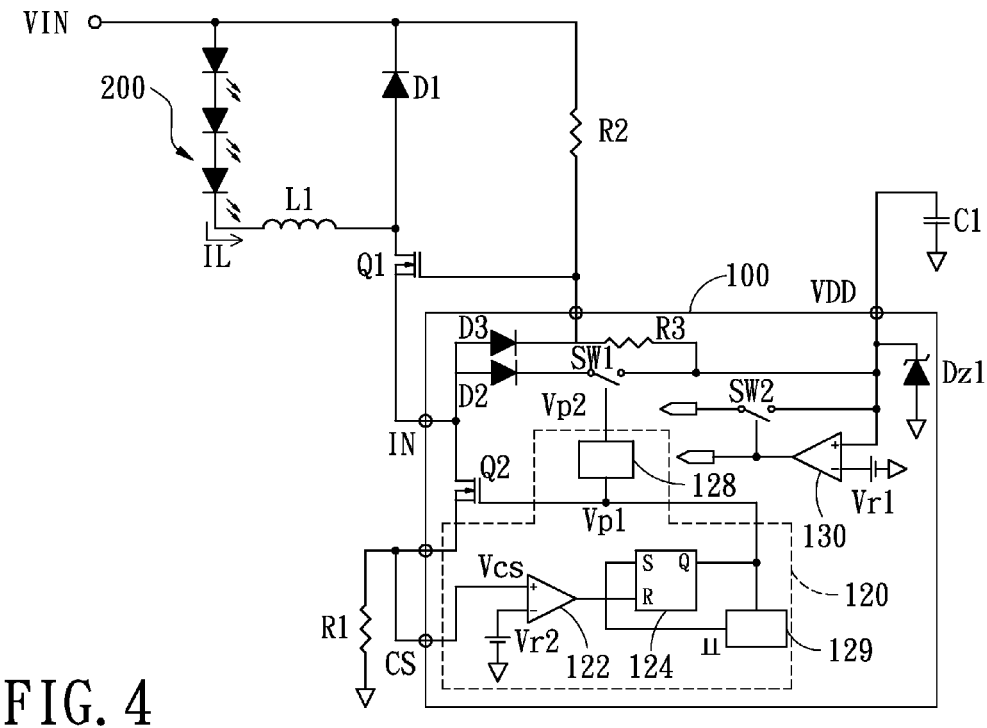
FIG. 4 shows a circuit diagram of a converter according to an embodiment of the present invention.

FIG. 4 shows a circuit diagram of a converter for driving an LED according to an embodiment of the present invention.

Figure 6:
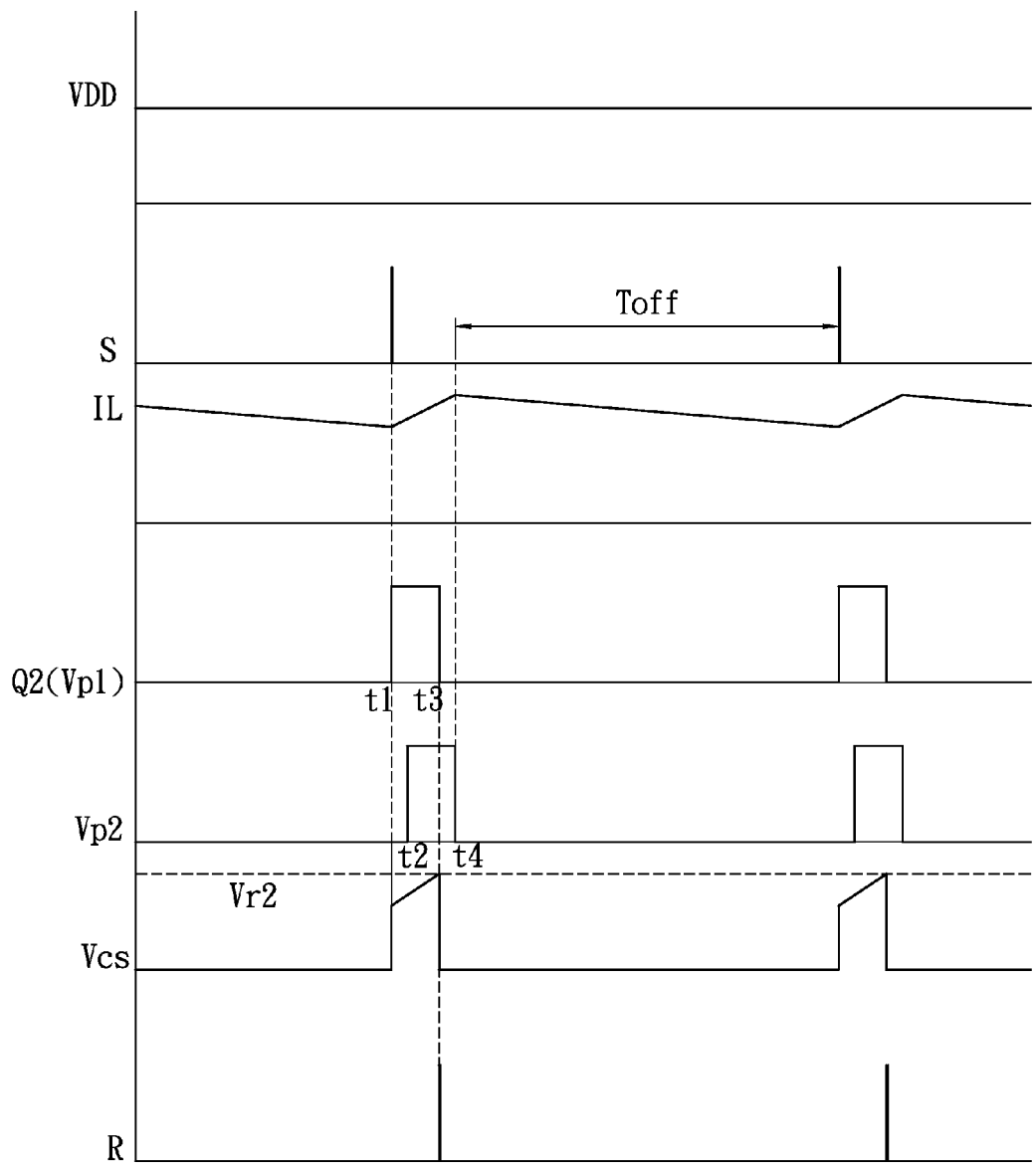
FIG. 6 shows a working waveform diagram of a converter according to an embodiment of the present invention.

FIG. 6 shows a working waveform of the converter. In FIG. 4, a buck converter is shown as an example, however, the present invention is not limited thereby. The present invention may use other kinds of non-isolated converter, such as a boost converter or a buck-boost converter, or other isolated converter, such as a flyback converter or a forward converter, etc.

As shown in FIG. 4, the converter has a conversion control circuit 100, an inductor L1, a diode D1, a power transistor Q1, and a current detection resistor R1. The inductor L1 and an LED lamp string 200 are series-connected between the voltage input terminal VIN and the drain of the power transistor Q1. The source of the power transistor Q1 is connected to an external voltage input terminal IN of the conversion control circuit 100, for providing the requisite operating power to the conversion control circuit 100. One end of the current detection resistor R1 is connected to a feedback voltage detection end CS of the conversion control circuit 100 while the other end is connected to a ground. Moreover, the current detection resistor R1 is coupled to the power transistor Q1 through the conversion control circuit 100, for detecting the current flowing through the LED lamp string 200.

The conversion control circuit has a voltage-regulating switch SW1, a control unit 120, and a built-in low-voltage transistor Q2. The voltage-regulating switch SW1 is series-connected with a diode D2. In this embodiment, one end of the voltage-regulating switch SW1 is coupled to the external voltage input terminal IN through the diode D2. Another end of the voltage-regulating switch SW1 is connected to a voltage-regulating capacitor C1, for generating a power voltage VDD. The voltage-regulating capacitor C1 may be built-in or externally-connected. However, the scope of the present invention is not limited thereby. The diode D2 is series-connected to the voltage-regulating switch SW1 for suppressing the current flowing through the voltage-regulating switch SW1. Thus, the diode D2 may also be disposed between the voltage-regulating switch SW1 and the voltage-regulating capacitor C1.

The control unit 120 detects a feedback voltage signal Vcs by using the feedback voltage detection end CS, and generates a turn-on pulse signal Vp1 and a voltage-regulating pulse signal Vp2 according to the feedback voltage signal Vcs, for respectively controlling the low-voltage transistor Q2 and the voltage-regulating switch SW1 to turn on or off. The low-voltage transistor Q2 is serially coupled between the power transistor Q1 and the current detection resistor R1. By controlling the operation of the low-voltage transistor Q2, the operation of the power transistor Q1 may be synchronously controlled.

At the beginning when the conversion control circuit 100 is not enabled, the input voltage Vin from the voltage input terminal VIN charges the voltage-regulating capacitor C1 through the resistors R2 and R3, thus the power voltage VDD is gradually increased. When the voltage level of the power voltage VDD reaches a reference voltage Vr1 of a under-voltage lock-out comparator 130, the under-voltage lock-out comparator 130 outputs high voltage level signal for turning on the power switch SW2, which makes the power voltage VDD start to provide the requisite working power to the conversion control circuit 100.

The control unit 120 has a comparator 122, an SR flip-flop 124, a delay circuit 128, and a timing cut-off circuit 129. The comparator 122 receives the feedback voltage signal Vcs from the current detection resistor R1, and compares the feedback voltage signal Vcs with a reference voltage Vr2, for generating and outputting a comparison signal to the input terminal R of the SR flip-flop 124. The SR flip-flop 124 generates and outputs an output signal to the delay circuit 128 according to the comparison signal. After the timing cut-off circuit 129 receives the output signal from the output end Q of the SR flip-flop 124, a timing circuit output signal is generated and transmitted to the input terminal S of the SR flip-flop 124. The timing sequence of the turn-on pulse signal Vp1 is the same as the timing sequence of the output signal of the output end Q of the SR flip-flop 124.

The delay circuit 128 generates the voltage-regulating pulse signal Vp2 which the starting timing thereof is later than the starting timing of the turn-on pulse signal Vp1. When the timing cut-off circuit 129 detects that the output end Q of the SR flip-flop 124 outputs low voltage level signal, a counting of the constant off time Toff is started, and after the off time Toff ends, a pulse signal is outputted to the input terminal S of the SR flip-flop 124, for making the output end Q of the SR flip-flop 124 output high voltage level signal.

As shown in FIG. 6, when the turn-on pulse signal Vp1 is switched to high voltage level from low voltage level for turning on the low-voltage transistor Q2, the voltage of the source of the power transistor Q1 decreases, turning on the power transistor Q1. At the moment, the current IL flows from the voltage input VIN through the LED lamp string 200, the inductor L1, the power transistor Q1, the low-voltage transistor Q2, and the current detection resistor R1 to the ground. The current IL may gradually increase.

After that, when the voltage-regulating pulse signal Vp2 turns on the voltage-regulating switch SW1, the low-voltage transistor Q2 may remain in conducting state, however, because the diode D2 between the external voltage input terminal IN and the voltage-regulating switch SW1 are still reverse-biased, there is no current flowing through the voltage-regulating switch SW1. The present current IL still flows through the path from the voltage input terminal VIN, the LED lamp string 200, the inductor L1, the power transistor Q1, the low-voltage transistor Q2, and the current detection resistor R1 to the ground. In this stage, the current IL flowing through the LED lamp string 200 continues to increase.

Until the time t3, after the feedback voltage signal Vcs is higher than the reference voltage Vr2, the output end Q of the SR flip-flop 124 outputs a low voltage level signal, and the turn-on pulse signal Vp1 is switched to low voltage level for cutting off the low-voltage transistor Q2, causing the diode D2 disposed between the external voltage input terminal IN and the voltage-regulating switch SW1 forward-biased. At the moment, the current IL flows from the voltage input terminal VIN through the LED lamp string 200, the inductor L1, the power transistor Q1, and the voltage-regulating switch SW1 to the voltage-regulating capacitor C1, for charging the voltage-regulating capacitor C1. Then, at time t4 when the voltage-regulating pulse signal Vp2 is switched to low voltage level for turning off the voltage-regulating switch SW1, the current IL stops flowing into the voltage-regulating capacitor C1, which ends the charging of the voltage-regulating capacitor C1. At this time, the current IL starts to decrease.

In this embodiment, after the pulse of the turn-on pulse signal Vp1 ends, the corresponding pulse of the voltage-regulating pulse signal Vp2 still remains conducting for a predetermined time. The default time is a charging period of the voltage-regulating capacitor C1 being charged by the external voltage input terminal IN. Please refer to FIG. 6, the starting time of the charging period is the same as the cut-off time of corresponding pulse of the turn-on pulse signal Vp1 (that is, the time t3). However, the scope of the present invention is not limited thereby. Just lengthen the delay time of the delay circuit 128 and control the voltage-regulating pulse signal Vp2 be turned on after a predetermined time when the corresponding pulse of the turn-on pulse signal Vp1 ends, the starting time of the charging period may be later than the cut-off time of corresponding pulse of the turn-on pulse signal Vp1.

In addition, this embodiment a Zener diode Dz1 is coupled to one end of the voltage-regulating capacitor C1. When the power voltage VDD is higher than the breakdown voltage of the Zener diode Dz1, the current IL stops flowing into the voltage-regulating capacitor C1. Alternatively, the current IL flows through a discharging path formed by the Zener diode Dz1 to the ground, for regulating the power voltage VDD to a predetermined voltage value (that is, the breakdown voltage of the Zener diode Dz1).

The non-isolated converter in this embodiment uses the switching voltage-regulating manner, for controlling the voltage-regulating switch SW1 to remain the turn-on status after the low-voltage transistor Q2 is cut off, which makes the electrical power coming from the external voltage input terminal IN may be able to be stored in the voltage-regulating capacitor C1 through the diode D2 and the voltage-regulating switch SW1. In addition, for preventing the power voltage VDD from going too high, besides properly setting the cut-off time of the voltage-regulating switch SW1, this embodiment may also connect the Zener diode Dz1 to the higher voltage end of the voltage-regulating capacitor C1. Therefore, this embodiment may be able to suppress the voltage for charging the voltage-regulating capacitor C1 when the voltage-regulating switch SW1 is turned on and the power voltage VDD is higher than the breakdown voltage of the Zener diode Dz1. The over-whelming energy may be split to the ground by the Zener diode Dz1, for avoiding the control components from being damaged by the extremely high power voltage VDD. Thus, the power consumption caused by the power voltage-regulating processes may be represented by the following functions (which under the assumption that the power voltage VDD does not exceed the breakdown voltage of the Zener diode Dz1):

$$\text{Power consumption}(Pd) = (VD + VSW) \times ILED\_valley \times duty \quad (4)$$

VD is the voltage drop of the diode D2, VSW is the voltage drop of the voltage-regulating switch SW1 when it is turned on, ILED_vally is the valley current flowing through the LED lamp string 200, and duty is the occupied time ratio of charging the voltage-regulating capacitor C1. Assuming that the turn-on resistance (Ron) of the voltage-regulating switch SW1 is 5 ohms, the valley current flowing through the LED lamp string 200 is 0.3 amperes, the cycle of the turn-on pulse is 20 microseconds, and the predetermined time is 0.2 microseconds. The values are used in the function (4), and the calculated power consumption (Pd)=(0.7+0.3×5)×(0.3)×(200n/20u)=0.07 (W).

Under the application of high AC input voltage, the power consumption of the non-isolated converter in this embodiment is only 0.07 W. For the common used 3 W LED, the occupied ratio is 2.33%. Thus, the non-isolated converter of the present invention may greatly improve the influences caused by the power voltage-regulating of the converter toward the efficiency of energy usage.

Figure 5:
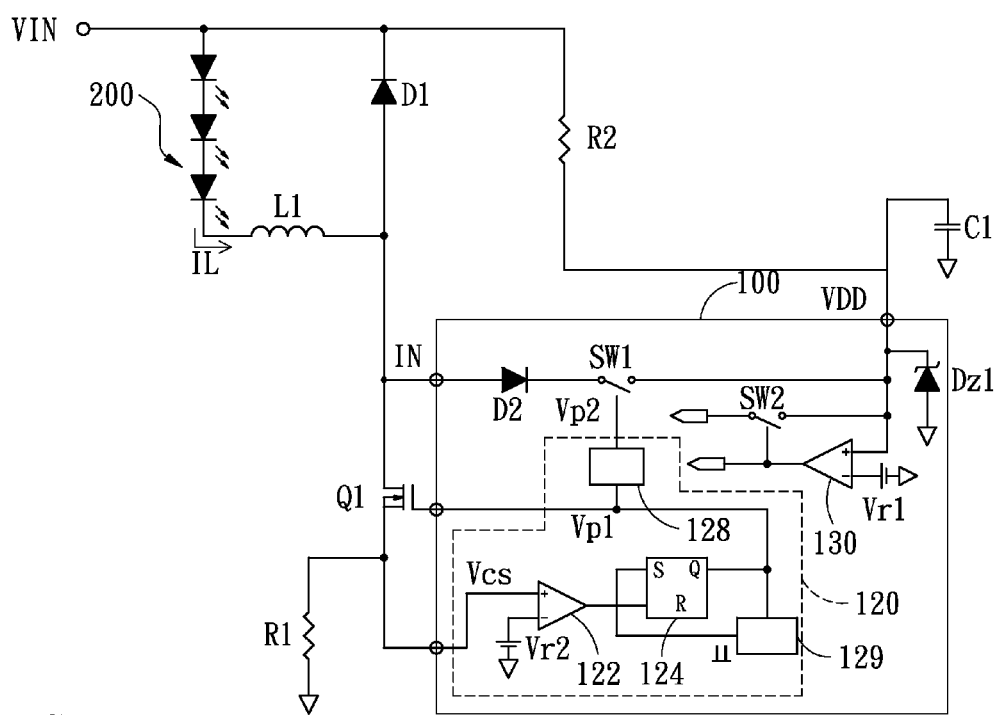
FIG. 5 shows a circuit diagram of a converter according to another embodiment of the present invention.

FIG. 5 shows a circuit diagram of a converter according to another embodiment of the present invention. Different from the converter in FIG. 4 that the turn-on pulse signal Vp1 indirectly controls the turn-on or turn-off status of the power transistor Q1 by controlling the low-voltage transistor Q2, this embodiment omits the low-voltage transistor Q2 and directly uses the turn-on pulse signal Vp1 for controlling the power transistor Q1 to turn on or off. In addition, the external voltage input terminal IN of the conversion control circuit 100 in FIG. 4 connects to the source of the power transistor Q1 for capturing electrical power, while the external voltage input terminal IN in this embodiment connects to the drain of the power transistor Q1 for capturing electrical power (that is, directly connects to the inductor L1).

Figure 7A:
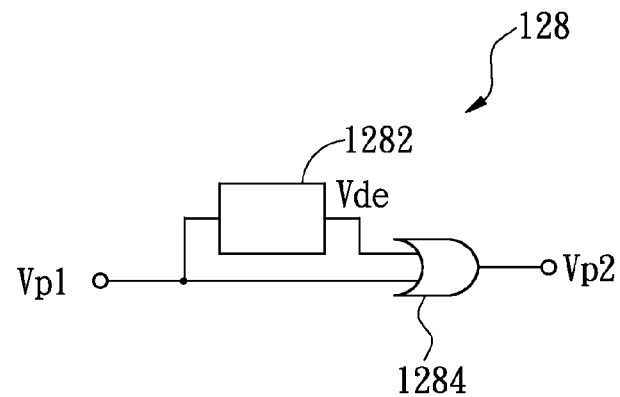
FIGS. 7A and 7B show a circuit diagram and a working waveform diagram of a delay circuit of a converter according to an embodiment of the present invention.
Figure 7B:
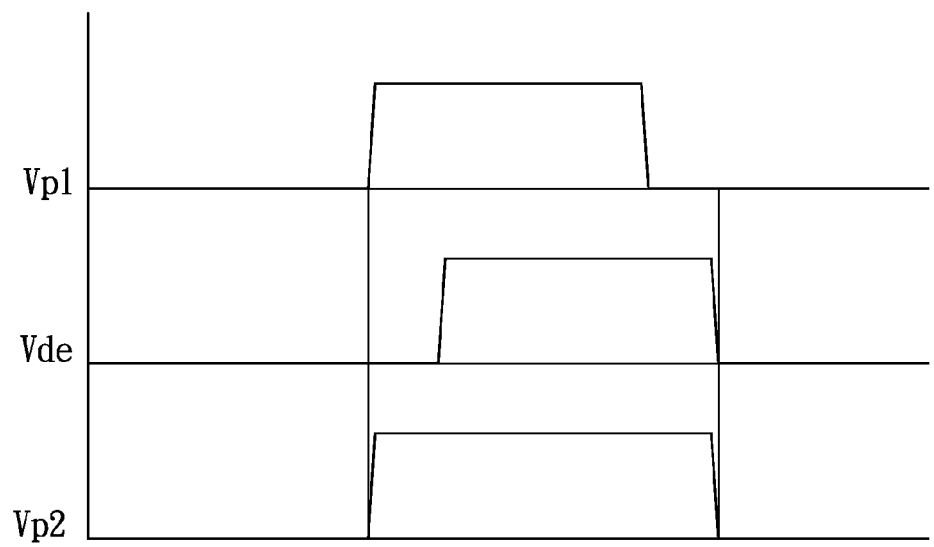

Moreover, in FIG. 6, after the turn-on pulse signal Vp1 is delayed by the delay circuit 128, the voltage-regulating pulse signal Vp2 which is delayed by a predetermined time compared with corresponding pulse of the turn-on pulse signal Vp1 is generated. However, the present invention is not limited thereby. FIGS. 7A and 7B show a circuit diagram and a working waveform diagram of the delay circuit 128 according to an embodiment. As shown in FIG. 7A, the delay circuit 128 has a delay unit 1282 and an OR gate 1284. The delay unit 1282 receives the turn-on pulse signal Vp1 from the timing cut-off circuit 129, for generating a delay signal Vde to delay a predetermined time. The delay signal Vde and the turn-on pulse signal Vp1 are inputted to the OR gate 1284 at the same time, for generating the voltage-regulating pulse signal Vp2. The pulse starting time of the voltage-regulating pulse signal Vp2 which is generated by using the delay circuit 128 may be the same as the pulse starting time of the turn-on pulse signal Vp1, and the pulse cut-off time of the voltage-regulating pulse signal Vp2 may be the same as the pulse cut-off time of the delay signal Vde.

Figure 8A:
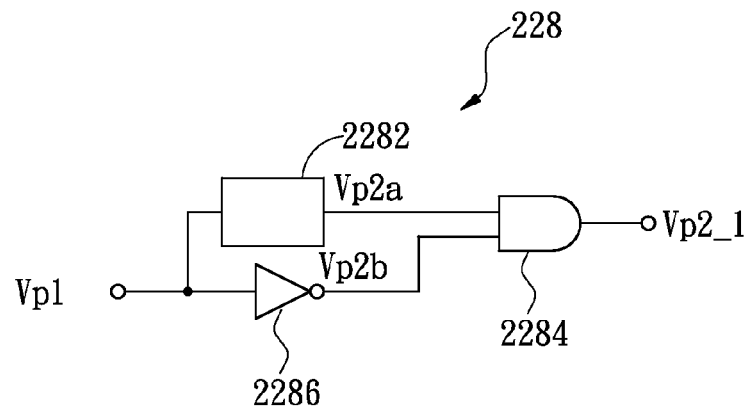
FIGS. 8A and 8B show a circuit diagram and a working waveform diagram of a delay circuit of a converter according to another embodiment of the present invention.
Figure 8B:
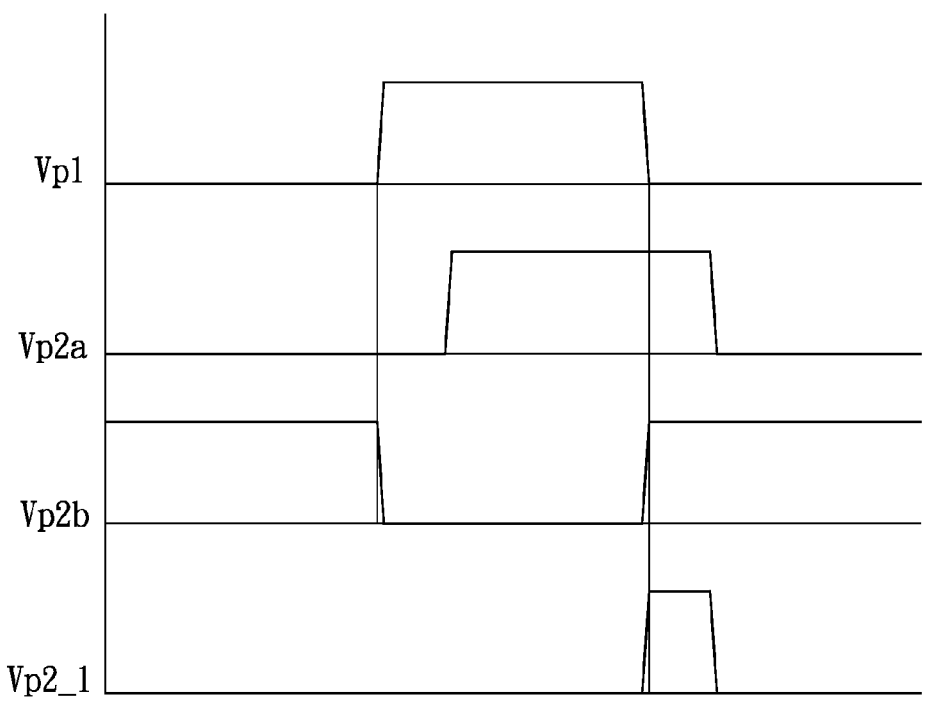

FIGS. 8A and 8B show a circuit diagram and a working waveform diagram of the delay circuit 128 according to another embodiment of the present invention. Different from the embodiment in FIGS. 7A and 7B that the turn-on pulse signal Vp1 and the voltage-regulating pulse signal Vp2 are at least partially overlapped, the voltage-regulating pulse signal Vp2_1 and the turn-on pulse signal Vp1 in this embodiment are complementary with each other. As shown in FIG. 8A, the delay circuit 228 has a delay unit 2282, an AND gate 2284, and an inverter 2286. After the turn-on pulse signals Vp1 pass through the delay unit 2282 and the inverter 2286, an output signal Vp2a of the delay unit 2282 which has been delayed by a predetermined time and an inversion signal of the inverter 2286 are generated. The output signal Vp2a of the delay unit 2282 and the inversion signal Vp2b are inputted to the AND gate 2284, for generating the voltage-regulating pulse signal Vp2_1. The pulse of the voltage-regulating pulse signal Vp2_1 generated by the delay circuit 228 and the corresponding pulse of the turn-on pulse signal Vp1 are complementary signals. As shown in FIG. 8B, the pulse starting time of the voltage-regulating pulse signal Vp2_1 is the same as the pulse cut-off time of the turn-on pulse signal Vp1.

Figure 9:
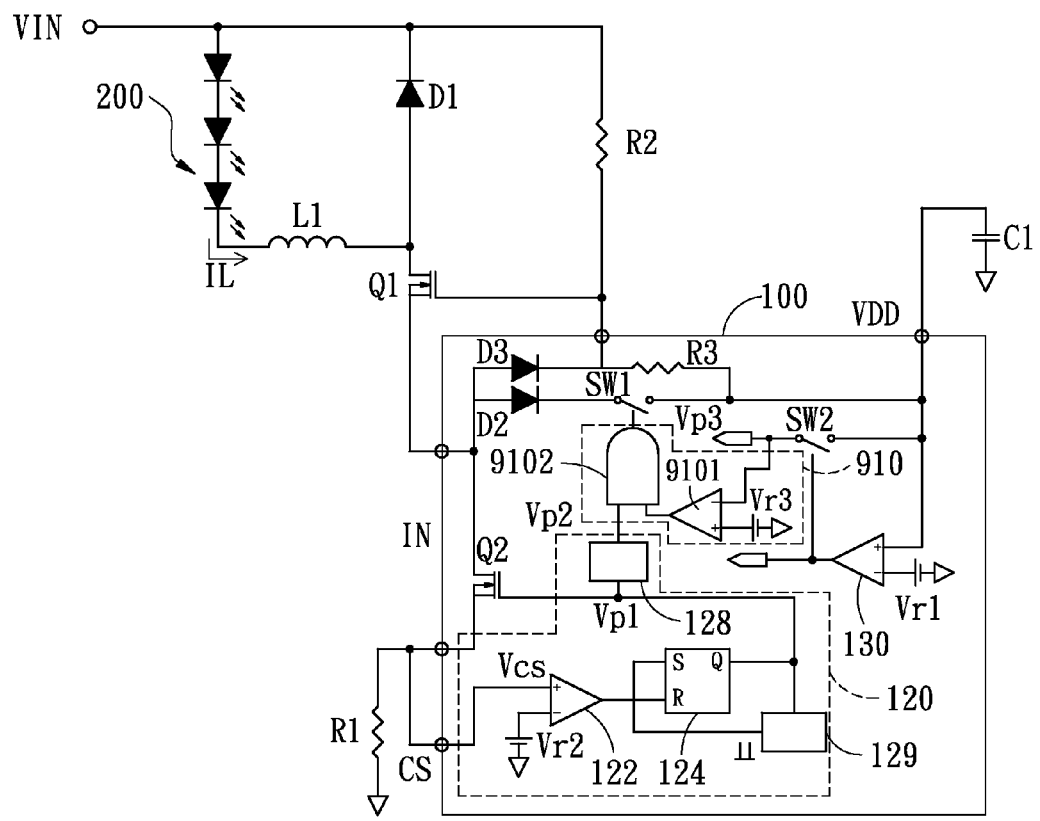
FIG. 9 shows a schematic diagram of an converter according to another embodiment of the present invention.

FIG. 9 shows a schematic diagram of a converter according to an embodiment of the present invention. Comparing with the embodiment in FIG. 4, this embodiment provides a power voltage detection circuit 910 coupled to the voltage-regulating capacitor C1, for detecting the power voltage VDD. The power voltage detection circuit 910 receives the voltage-regulating pulse signal Vp2 from the delay circuit 128, and detects the power voltage VDD, for outputting a power voltage detection signal Vp3 to control the turn-on status of the voltage-regulating switch SW1. The power voltage detection circuit 910 has a comparator 9101 and an AND gate 9102. The comparator 9101 compares the voltage level of the power voltage VDD with a predetermined reference voltage value Vr3, and outputs a comparison signal. The AND gate 9102 outputs the power voltage detection signal Vp3 according to the comparison signal and the voltage-regulating pulse signal Vp2 for controlling the voltage-regulating switch SW1. Thus, the power voltage detection circuit 910 outputs high voltage level power voltage detection signal Vp3 for turning on the voltage-regulating switch SW1 when the voltage-regulating pulse signal Vp2 and the comparison signal are both at high voltage level (that is, when the voltage level of the power voltage VDD is lower than the predetermined reference voltage value Vr3).

Figure 9A:
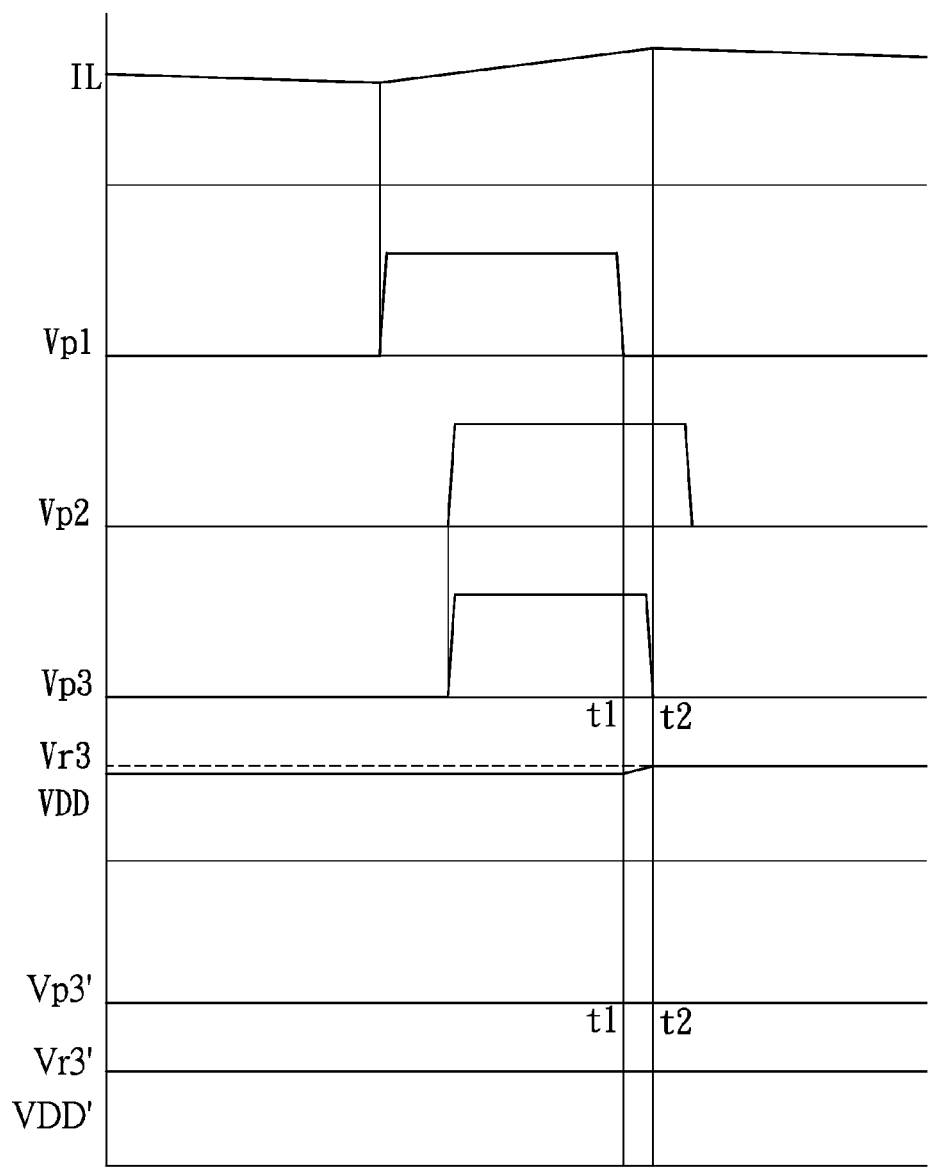
FIG. 9A shows a working waveform diagram of the converter in FIG. 9.

FIG. 9A shows a working waveform diagram of the converter in FIG. 9. Please refer to FIGS. 9 and 9A at the same time. At the beginning, the voltage level of the power voltage VDD is lower than the predetermined reference voltage value Vr3. At the time t1, the external voltage input terminal IN starts to charge the voltage-regulating capacitor C1, and voltage value of the power voltage VDD starts to increase. Until the voltage value of the power voltage VDD is higher than the predetermined reference voltage value Vr3 (at the time t2), the power voltage detection circuit 910 outputs the power voltage detection signal Vp3 with low voltage level cutting off the voltage-regulating switch SW1 to avoid the voltage value of the power voltage VDD from exceeding the reference voltage value Vr3. In other words, the power voltage detection circuit 910 may shorten the length of the time for charging the voltage-regulating capacitor C1 when the power voltage VDD is higher than the reference voltage value Vr3. That is, the charging period lies only between the time t1 to time t2, thus problem of generating overwhelming power voltage VDD may be avoided.

In the mentioned embodiment, before the external voltage input terminal IN starts to charge the voltage-regulating capacitor C1 (that is, before the time t1), the voltage level of the power voltage VDD is lower than the predetermined reference voltage value Vr3. In addition, if the voltage level of the power voltage VDD' equals to or is higher than the predetermined reference voltage value Vr3 before the time t1, the power voltage detection signal Vp3' may remain at low voltage level, and the voltage-regulating switch SW1 may remain at cut-off status. Thus, the converter may still be able to reduce the power consumption caused by switching the voltage-regulating switch SW1 within the working cycle.

Figure 10:
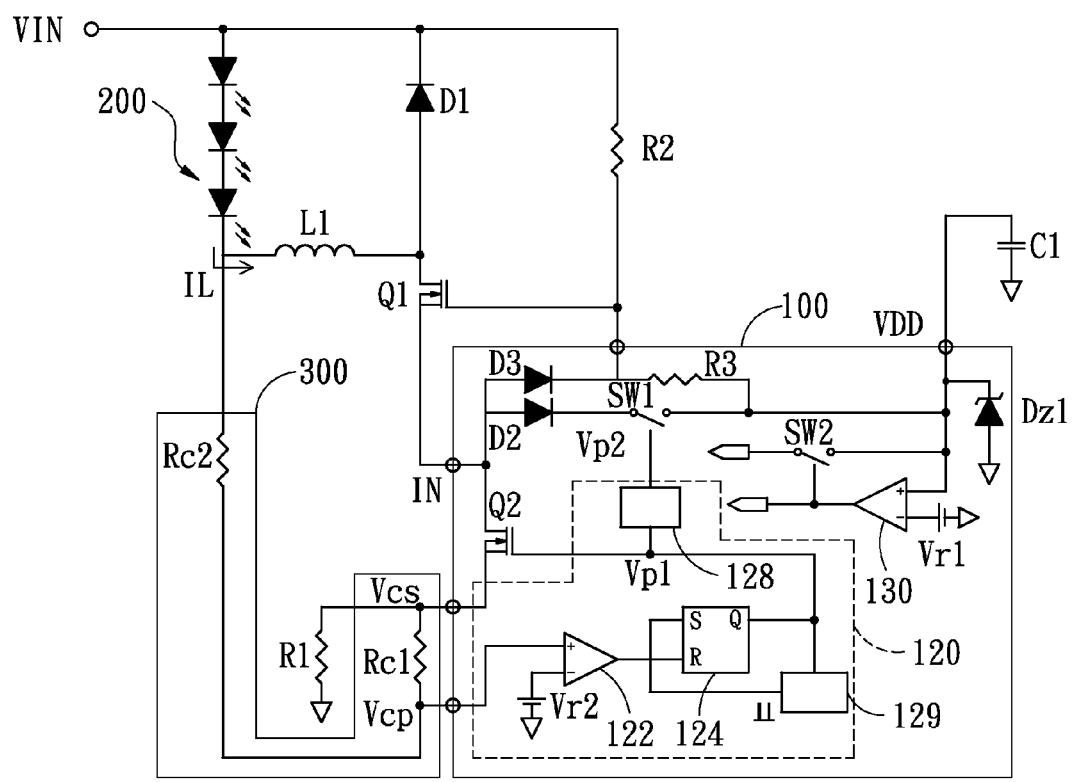
FIG. 10 shows a schematic diagram of an converter according to another embodiment of the present invention.

FIG. 10 shows a schematic diagram of a converter according to another embodiment of the present invention. As described above, the present invention uses a voltage-regulating pulse signal Vp2 which has later timing comparing with the turn-on pulse signal Vp1 for turning on the voltage-regulating switch SW1 after the low-voltage transistor Q2 is cut off, to capture the requisite working power of the conversion control circuit 100. Because the operations of the conversion control circuit 100 which controls the low-voltage transistor Q2 according to the feedback voltage signal Vcs may have a signal transmission delay, there may be a time delay between the time when the conversion control circuit 100 detects that the voltage level of the feedback voltage signal Vcs is higher than the reference voltage Vr2 and the cut-off time of the pulse of the turn-on pulse signal Vp1. Within the time delay, the low-voltage transistor Q2 remains the turn-on status, thus the current IL flowing through the LED lamp string 200 may be continuously increasing.

The relation between the input voltage and the generated current of the converter may be represented by the following function:

$$\Delta i/\Delta t=(Vin-VLED)/L \quad (5)$$

Figure 11:
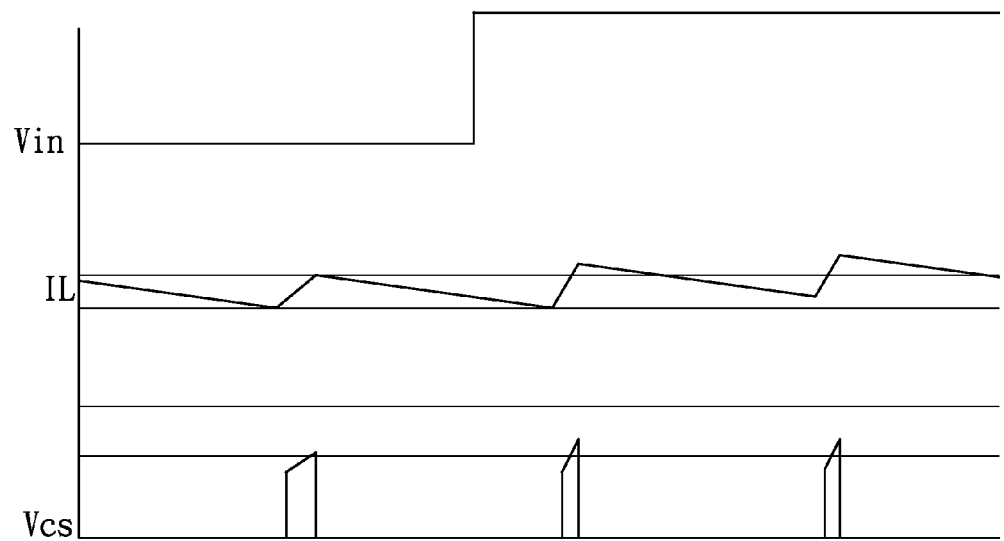
FIG. 11 shows a waveform diagram of an LED current and a feedback voltage signal of a converter in FIG. 10 before being compensated by a compensation circuit.

$\Delta i/\Delta t$ is the current slope of the current IL flowing through the LED lamp string 200, Vin is the input voltage of the voltage input terminal VIN, VLED is the voltage difference between the two ends of the LED lamp string 200, and L is the inductance of the inductor L1. From the function (5), the current slope $\Delta i/\Delta t$ is relative to the input voltage Vin, the voltage difference VLED between two ends of the LED lamp string 200, and the inductance L of the indictor L1. Under the situations that the inductance L and the voltage difference VLED are fixed values, the current slope $\Delta i/\Delta t$ of the current IL flowing through the LED lamp string 200 changes along with the input voltage Vin of the voltage input terminal VIN. The conversion control circuit 100 has a fixed signal transmission delay, and the time delay may cause the current IL of the LED lamp string 200 to have different peak values under different input voltage Vin, as shown in FIG. 11.

Figure 12:
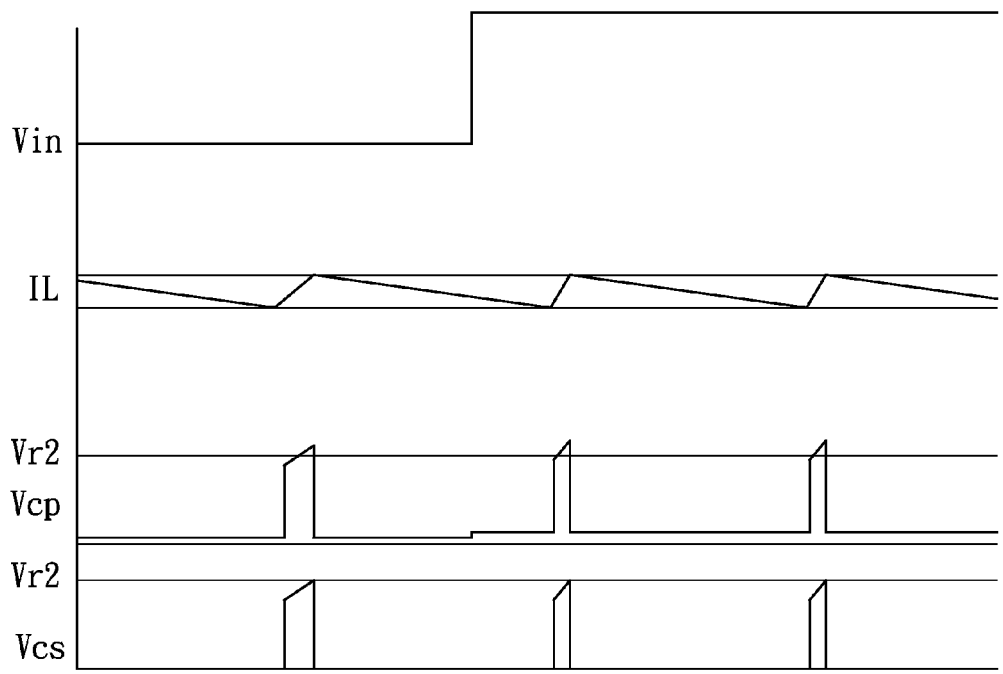
FIG. 12 shows a waveform diagram of an LED current and a feedback voltage signal of a converter in FIG. 10 after being compensated by a compensation circuit.

For compensating the time delay, the converter in this embodiment may have a compensation circuit 300 coupled to the current detection resistor R1, to adjust the voltage level of the feedback voltage signal Vcs. As shown in FIG. 10, the compensation circuit has a first resistor Rc1 and a second resistor Rc2 series-connected between the higher voltage end of the current detection resistor R1 (that is, the end for outputting the feedback voltage signal Vcs) and the inductor L1. The connection point between the first resistor Rc1 and the second resistor Rc2 outputs a compensation detection signal Vcp for compensating the signal delay of the turn-on pulse signal caused by the delay circuit 128. Please also refer to FIG. 12, the voltage level of the feedback voltage signal Vcs equals to the voltage level of the compensation detection signal Vcp pluses the voltage division generated by the first resistor Rc1 and the second resistor Rc2. The magnitude of the voltage division may change along with the input voltage Vin, for making the peak value of the current IL flowing through the LED lamp string 200 remain at fixed value.

Figure 13:
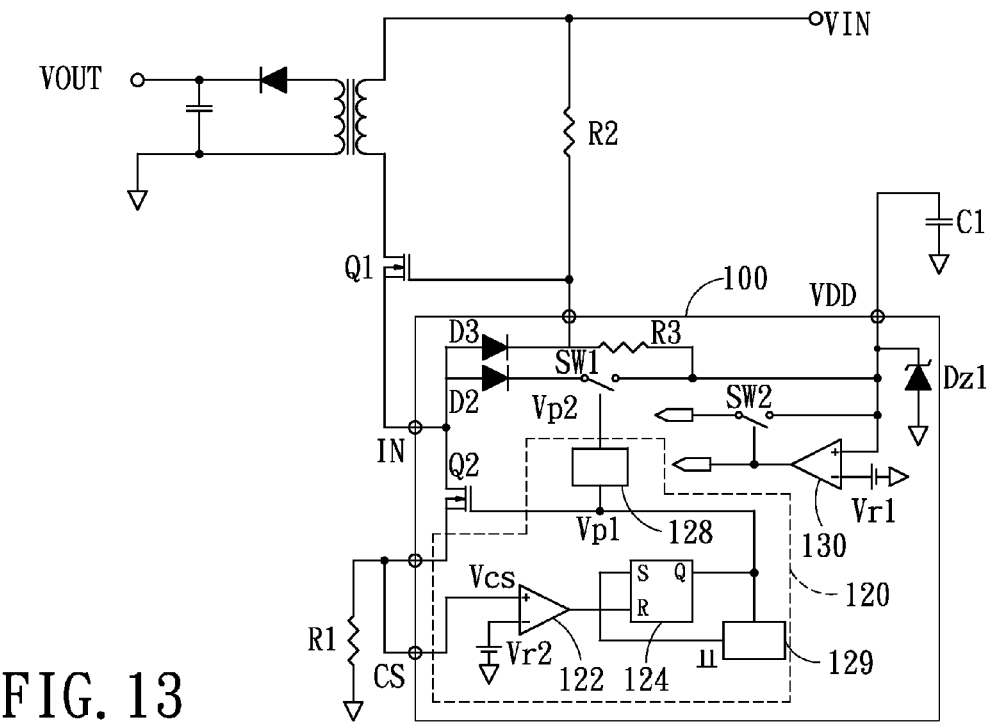
FIG. 13 shows a schematic diagram of an converter according to another embodiment of the present invention.

FIG. 13 shows a schematic diagram of a converter according to another embodiment of the present invention. Comparing with the aforementioned embodiments which disclose non-isolated converter and applies to drive the LED lamp string 200, this embodiment applies the techniques of the present invention to an isolated converter, for converting the input voltage VIN into output voltage VOUT.

Figure 14:
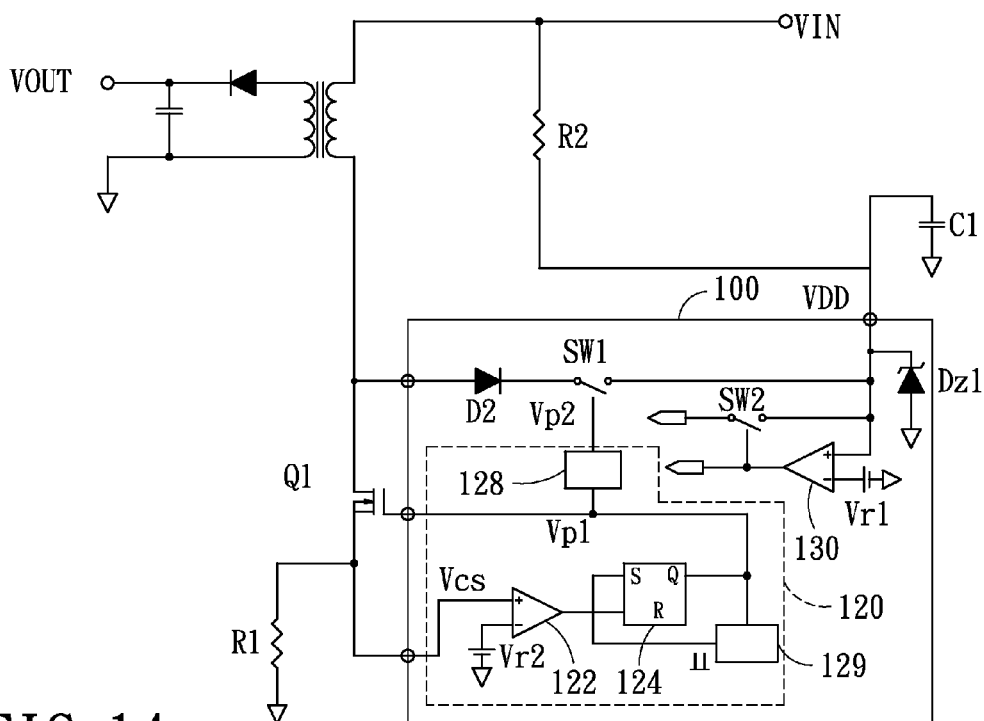
FIG. 14 shows a schematic diagram of an converter according to another embodiment of the present invention.

FIG. 14 shows a schematic diagram of a converter according to another embodiment of the present invention. Comparing with the embodiment in FIG. 13, this embodiment uses the drain of the power transistor Q1 as the external voltage input terminal IN, and omits the low-voltage transistor Q2 and directly uses the turn-on pulse signal Vp1 to control the power transistor Q1 to turn on or off.

Figure 15:
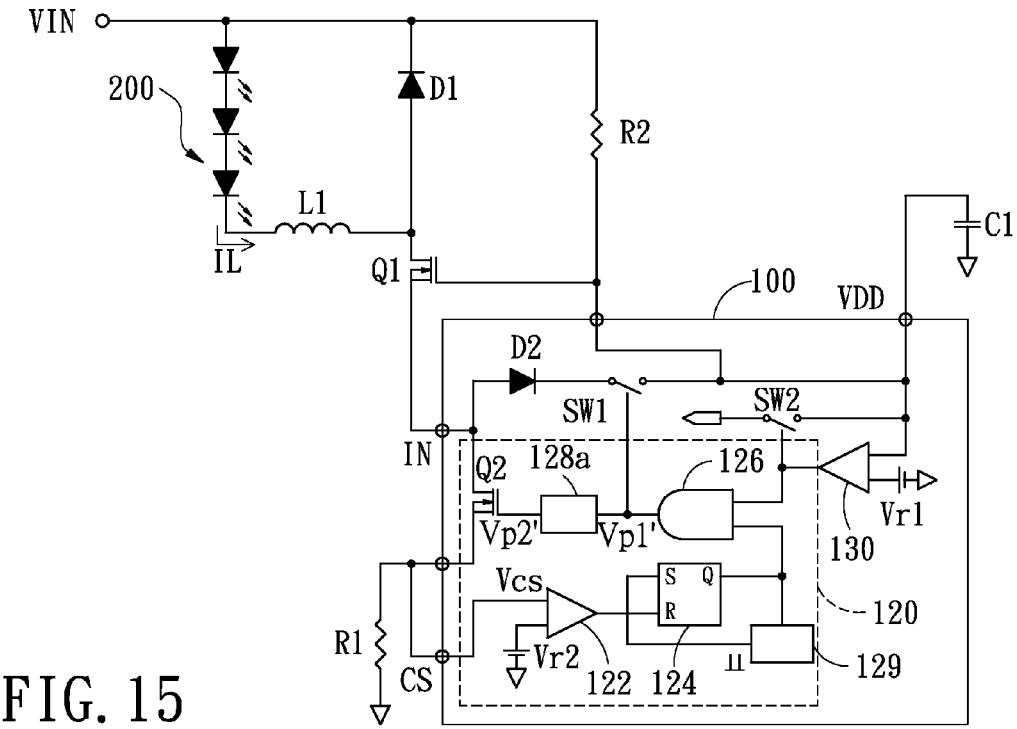
FIG. 15 shows a schematic diagram of an converter according to another embodiment of the present invention.

FIG. 15 shows a schematic diagram of a converter according to another embodiment of the present invention. Different from the converter in FIG. 4 in which the delay circuit 128 generates the voltage-regulating pulse signal Vp2 having the pulse starting time being later than the turn-on pulse signal Vp1 according to the turn-on pulse signal Vp1. The delay circuit 128a of this embodiment generates the turn-on pulse signal Vp2' having the pulse starting time being later than the voltage-regulating pulse signal Vp1' according to the voltage-regulating pulse signal Vp1' from the AND gate 126. Please also refer to FIG. 17, which provides the working waveforms of the converter in FIG. 15. Different from FIG. 6 in which the starting time of the charging period of the voltage-regulating capacitor C1 being charged by the external voltage input terminal VIN is the same or later than the pulse cut-off time of the turn-on pulse signal Vp1, the starting time of charging period in this embodiment is the same as the pulse starting time of the voltage-regulating pulse signal Vp1', and the cut-off time of the charging period is the same as the pulse starting time of the turn-on pulse signal Vp2'.

As shown in FIG. 15, the converter has a conversion control circuit 100, an inductor L1, a diode D1, a power transistor Q1, and a current detection resistor R1. The inductor L1 and the LED lamp string 200 are series-connected between the voltage input terminal VIN and the drain of the power transistor Q1. The source of the power transistor Q1 is connected to an external voltage input terminal IN of the conversion control circuit 100, for providing requisite working power to the conversion control circuit 100. One end of the current detection resistor R1 is connected to a feedback voltage detection end CS of the conversion control circuit 100 while the other end thereof is connected to the ground. The current detection resistor R1 may also be coupled to the power transistor Q1 through the conversion control circuit 100, for detecting the current flowing through the LED lamp string 200.

The conversion control circuit 100 has a voltage-regulating switch SW1, a control unit 120, and a built-in low-voltage transistor Q2. The voltage-regulating switch SW1 is series-connected with a diode D2. In this embodiment, one end of the voltage-regulation switch SW1 is coupled to the external voltage input terminal IN through the diode D2. The other end of the voltage-regulation switch SW1 is connected with a voltage-regulation capacitor C1, for generating power voltage VDD. The voltage-regulating capacitor C1 may be a built-in or external-connected component, however, the present invention is not limited thereby. The diode D2 is series-connected to the voltage-regulating switch SW1 for suppressing the current flowing through the voltage-regulating switch SW1, thus, the diode D2 may also be disposed between the voltage-regulating switch SW1 and the voltage-regulating capacitor C1.

The control unit 120 detects a feedback voltage signal Vcs from the current detection resistor R1 through the feedback voltage detection end CS, and generates a voltage-regulating pulse signal Vp1' and a turn-on pulse signal Vp2' according to the feedback voltage signal Vcs, for respectively controlling the operations of the voltage-regulating switch SW1 and the low-voltage transistor Q2.

At the beginning when the conversion control circuit 100 is not yet working, the input voltage Vin from the voltage input terminal VIN charges the voltage-regulating capacitor C1 through the resistor R2, for making the power voltage VDD increase gradually. When the voltage level of the power voltage VDD reaches the reference voltage Vr1 of the under-voltage lock-out comparator 130, the comparator 130 outputs high voltage level signal for turning on the power switch SW2, and for making the power voltage VDD provide requisite working power to the conversion control circuit 100.

The control unit 120 has a comparator 122, an SR flip-flop 124, am AND gate 126, a delay circuit 128a, and a timing cut-off circuit 129. The comparator 122 receives the feedback voltage signal Vcs from the current detection resistor R1, and compares the signal Vcs with a reference voltage Vr2, for generating and outputting a comparison signal to the input terminal R of the SR flip-flop 124. The SR flip-flop generates an output signal to the AND gate 126 according to the comparison signal. One input terminal of the AND gate 126 receives the output signal from the output end Q of the SR flip-flop 124, and the other input terminal of the AND gate 126 receives the signal from the output end of the under-voltage lock-out comparator 130. Under the situation that the power voltage VDD exceeds the reference voltage Vr1, the output signal of the comparator 130 remains at high voltage level, thus the output signal (that is, the voltage-regulating pulse signal Vp1') of the AND gate 126 is controlled by the output signal of the SR flip-flop 124. The timing of the voltage-regulating pulse signal Vp1' is the same as the timing of the output signal of the output end Q of the SR flip-flop 124.

Figure 18A:
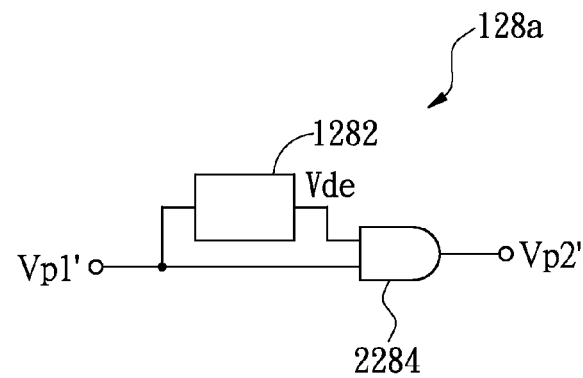
FIGS. 18A and 18B show a circuit diagram and a working waveform diagram of a delay circuit in FIG. 15 according to an embodiment of the present invention.
Figure 18B:
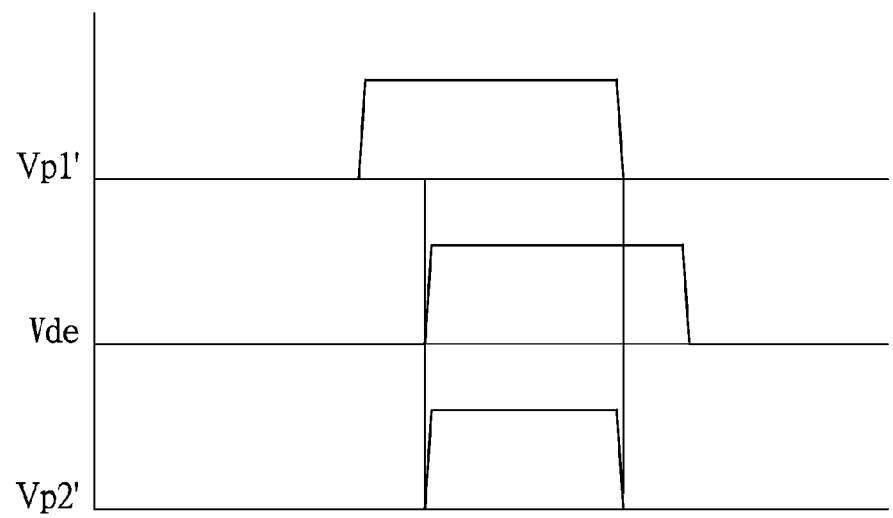

The delay circuit 128a generates the turn-on pulse signal Vp2' having the pulse starting time being later than the voltage-regulating pulse signal Vp1' according to the voltage-regulating pulse signal Vp1' from the AND gate 126. FIGS. 18A and 18B show a circuit diagram and a working waveform diagram of the delay circuit 128a according to an embodiment of the present invention. As shown in FIG. 18A the delay circuit 128a has a delay unit 1282 and an AND gate 2284. The delay unit 1282 receives the voltage-regulating pulse signal Vp1' from the delay unit 1282, for generating a delay signal Vde which is delayed by a predetermined time. The delay signal Vde and the voltage-regulating pulse signal Vp1' are simultaneously inputted into the AND gate 2284 for generating the turn-on pulse signal Vp2'. The cut-off time of the pulse of the turn-on pulse signal Vp2' generated by the delay circuit 128a may be the same as the cut-off time of corresponding pulse of the voltage-regulating pulse signal Vp1'.

The timing cut-off circuit 129 starts to count a predetermined constant off time Toff when it detects that the output end Q of the SR flip-flop 124 is at low voltage level. When the off time Toff ends, the timing cut-off circuit 129 outputs pulse signal to the input terminal S of the SR flip-flop 124, which makes the output end Q of the SR flip-flop 124 output high voltage level signal.

Figure 17:
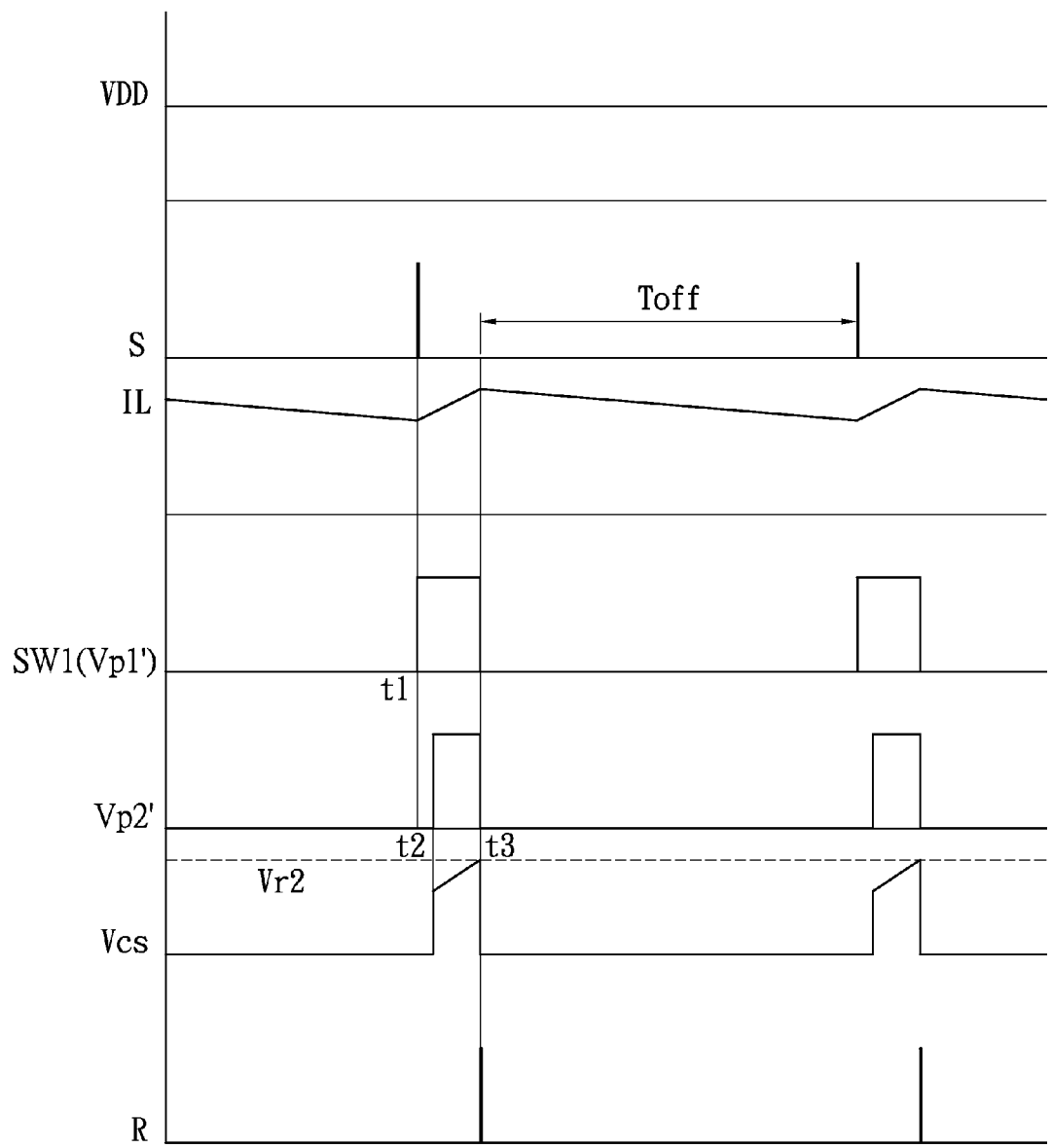
FIG. 17 shows a working waveform diagram of an converter in FIG. 15.

As shown in FIG. 17, at the time t1 when the voltage-regulating pulse signal Vp1' is switched from low to high for turning on the voltage-regulating switch SW1, the voltage level of the source of the power transistor Q1 decreases, which makes the power transistor Q1 turn on. At the moment, the current IL flows from the voltage input terminal VIN through the LED lamp string 200, the inductor L1, the power transistor Q1, the diode D2, and the voltage-regulating switch SW1 to the voltage-regulating capacitor C1. The current IL may increase gradually.

After that, at time t2 when the turn-on pulse signal Vp2' turns on the low-voltage transistor Q2, although the voltage-regulating switch SW1 still remains at turn-on status, the diode D2 between the external voltage input terminal IN and the voltage-regulating switch SW1 may be reverse-biased, which stops the current flowing through the voltage-regulation switch SW1. The present current IL flows from the voltage input terminal VIN through the LED lamp string 200, the inductor L1, the power transistor Q1, the low-voltage transistor Q2, and the current detection resistor R1 to the ground. At this stage, the current IL flowing through the LED lamp string 200 may continuously increase. Until time t3 when the low-voltage transistor Q2 is turned off, the current IL starts to decrease.

The non-isolated converter in this embodiment uses the switching voltage-regulating manner. At a predetermined time before the low-voltage transistor Q2 turns on, the voltage-regulating switch SW1 is turned on. The predetermined time is a charging period of the voltage-regulating capacitor C1 being charged by the external voltage input terminal IN. Please refer to FIG. 17, the starting time of the charging period is the same as the pulse starting time (the time t1) of the voltage-regulating pulse signal Vp1', and the pulse cut-off time thereof is the same as the pulse starting time (the time t2) of the turn-on pulse signal Vp2'. The length of the predetermined time is controlled by the delay circuit 128a. Within the predetermined time, the power from the external voltage input terminal IN is stored into the voltage-regulating capacitor C1 through the diode D2 and the voltage-regulating switch SW1. After the low-voltage transistor Q2 is turned on, the diode D2 may be reverse-biased, which stops the current from charging the voltage-regulating capacitor C1.

Figure 16:
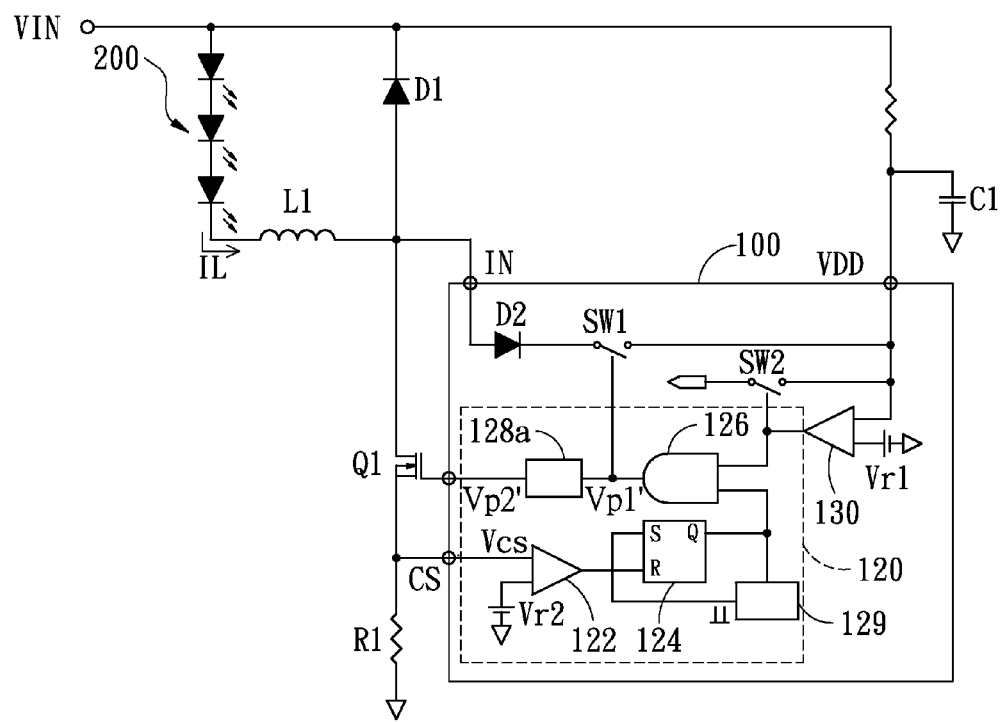
FIG. 16 shows a schematic diagram of an converter according to another embodiment of the present invention.

FIG. 16 shows a circuit diagram of a converter according to another embodiment of the present invention. Different from the converter in FIG. 15 that the turn-on pulse signal Vp2' indirectly controls the operation of the power transistor Q1 by controlling the low-voltage transistor Q2, this embodiment omits the low-voltage transistor Q2 and directly uses the turn-on pulse signal Vp2' to control the operation of the power transistor Q1 t. In addition, different from the conversion control circuit 100 in FIG. 15 that the external voltage input terminal IN is connected to the source of the power transistor for capturing power, this embodiment connects the external voltage input terminal IN to the drain of the power transistor Q1 (that is, connecting to the inductor L1) for capturing power.

Figure 19:
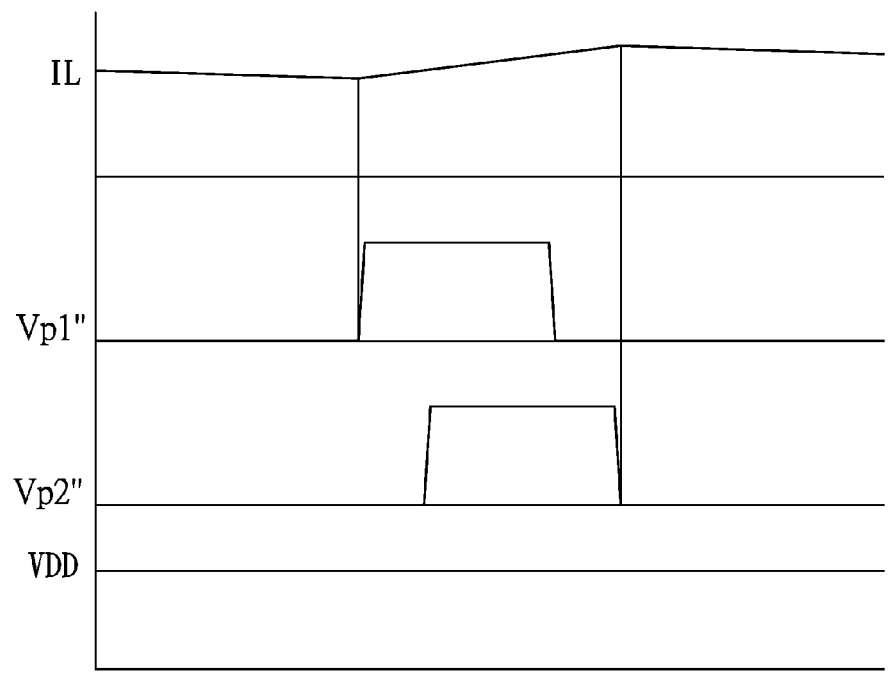
FIG. 19 shows a waveform diagram of a voltage-regulating pulse signal and a turn-on pulse signal generated by a conversion control circuit according to another embodiment of the present invention.

Moreover, in the embodiment of FIG. 17, the pulse starting time of the turn-on pulse signal Vp2' is later than the pulse starting time of the voltage-regulating pulse signal Vp1', however, the pulse cut-off times of the two are the same. The scope of the present invention is not limited thereby. FIG. 19 shows a working waveform diagram of a voltage-regulating pulse signal Vp1" and a turn-on pulse signal Vp2" according to another embodiment of the present invention. This embodiment uses the delay circuit 128a for wholly delaying the voltage-regulating pulse signal Vp1" by a predetermined time, to generate the turn-on pulse signal Vp2". In this embodiment, the pulse starting time of signal Vp1" is earlier than the pulse starting time of the signal Vp2", and the durations of the two are the same. Thus, the pulse cut-off times of the signals Vp1" and Vp2" are different.

Figure 20:
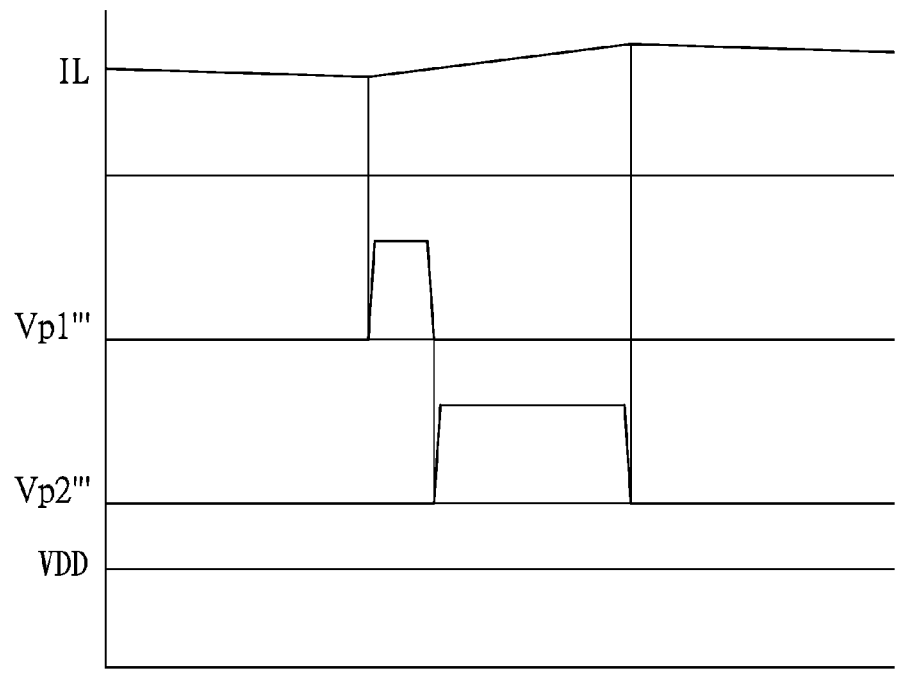
FIG. 20 shows a waveform diagram of a voltage-regulating pulse signal and a turn-on pulse signal generated by a conversion control circuit according to another embodiment of the present invention.
Figure 20A:
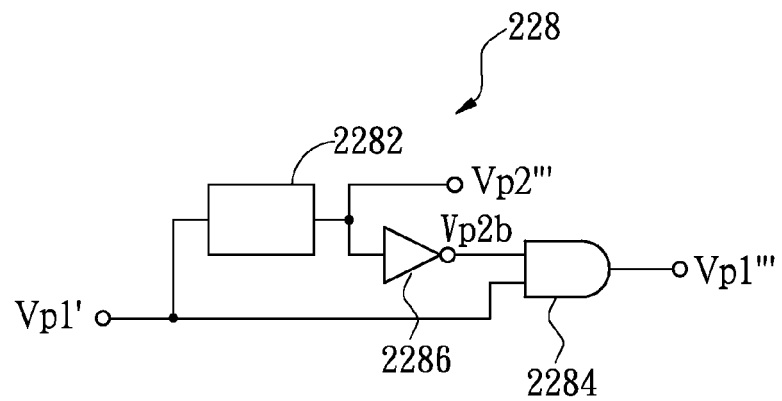
FIGS. 20A and 20B show a circuit diagram and a working waveform diagram of a delay circuit for generating a voltage-regulating pulse signal and a turn-on pulse signal in FIG. 20 according to an embodiment of the present invention.
Figure 20B:
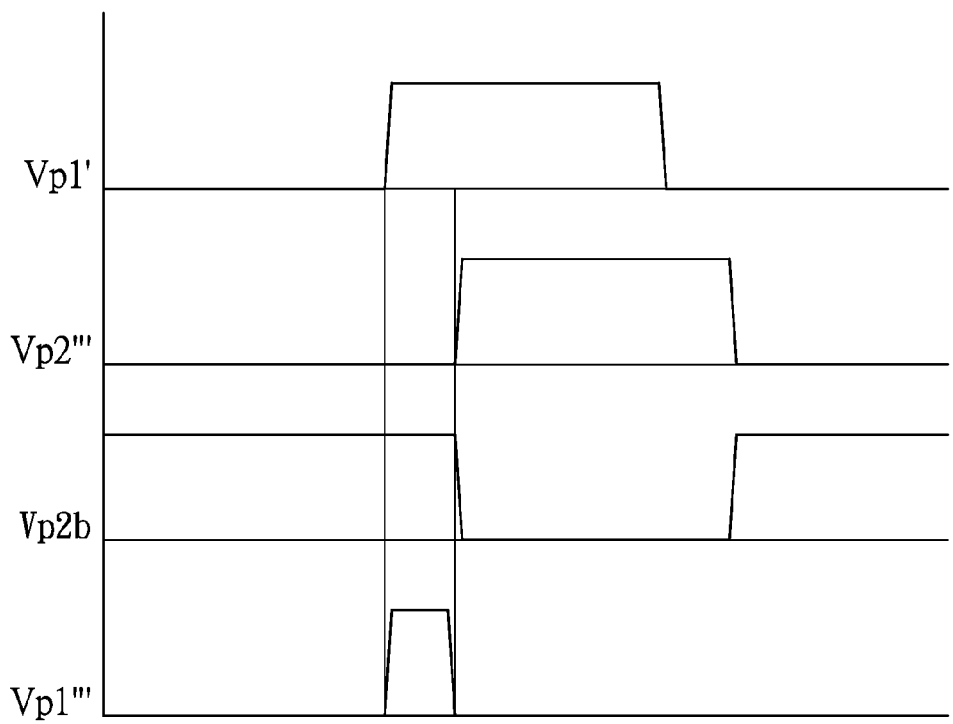

FIG. 20 shows a working waveform diagram of a voltage-regulating pulse signal Vp1''' and a turn-on pulse signal Vp2''' according to another embodiment of the present invention. Different from the embodiments in FIGS. 18B and 19 that the voltage-regulating pulse signals Vp1' and Vp1" are partially overlapped with the turn-on pulse signals Vp2' and Vp2", the voltage-regulating pulse signal Vp1''' and the turn-on pulse signal Vp2''' in this embodiment are complementary with each other. FIGS. 20A and 20B show a circuit diagram and a working waveform diagram of the delay circuit 228 for generating the voltage-regulating pulse signal Vp1''' and the turn-on pulse signal Vp2'''. As shown in FIG. 20A, the delay circuit 228 has a delay unit 2282, an AND gate 2284, and an inverter 2286. Different from the embodiment in 18A, the output signal Vp1' of the AND gate 126 in the present invention is not directly used as the voltage-regulating pulse signal Vp1'''. The delay unit 2282 receives the output signal Vp1' from the AND gate 126 for generating the turn-on pulse signal Vp2''' which is wholly delayed by a predetermined time. The inverter 2286 receives the turn-on pulse signal Vp2''' and generates an inversion signal Vp2b. The inversion signal Vp2b and the output signal Vp1' of the AND gate 126 are inputted to the AND gate 2286 for generating the voltage-regulating pulse signal Vp1'''. The pulse of the turn-on pulse signal Vp2''' generated by the delay circuit 228 and the corresponding pulse of the voltage-regulating pulse signal Vp1''' are complementary with each other.

Figure 20C:
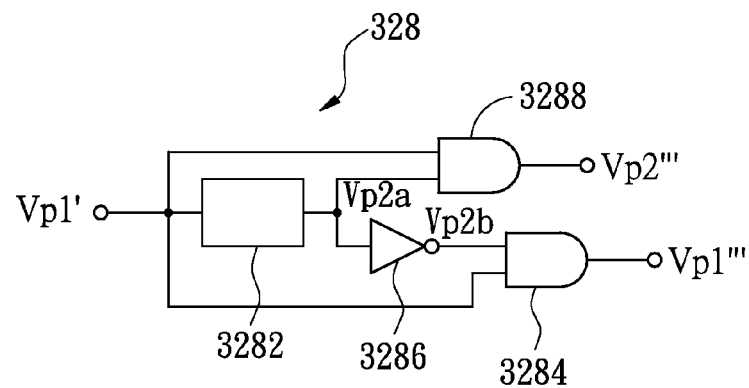
FIGS. 20C and 20D show a circuit diagram and a working waveform diagram of a delay circuit for generating a voltage-regulating pulse signal and a turn-on pulse signal in FIG. 20 according to another embodiment of the present invention.
Figure 20D:
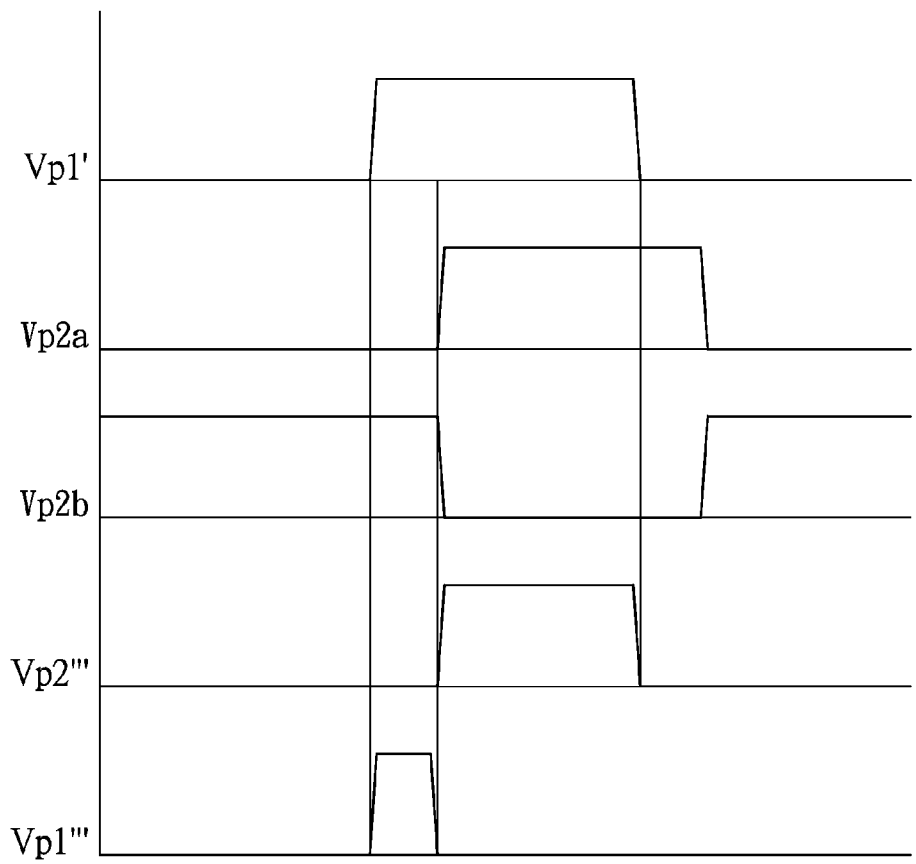

FIGS. 20C and 20D show a circuit diagram and a working waveform diagram of the delay circuit 228 for generating the voltage-regulating pulse signal Vp1''' and the turn-on pulse signal Vp2''' according to another embodiment of the present invention. As shown in FIG. 20C, the delay circuit 328 has a delay unit 3282, a first AND gate 3284, an inverter 3286, and a second AND gate 3288. Different from the embodiment in FIG. 20A, the output signal Vp2a of the delay unit 3282 in this embodiment is not used as the turn-on pulse signal Vp2'''. The output signal Vp2a of the delay unit 3282 and the output signal Vp1' of the AND gate 126 are inputted to the second AND gate 3288 for generating the turn-on pulse signal Vp2'''. The cut-off time of the pulse of the turn-on pulse signal Vp2''' is the same as the cut-off time of corresponding pulse of the input signal Vp1' of the first AND gate 3284.

Figure 21:
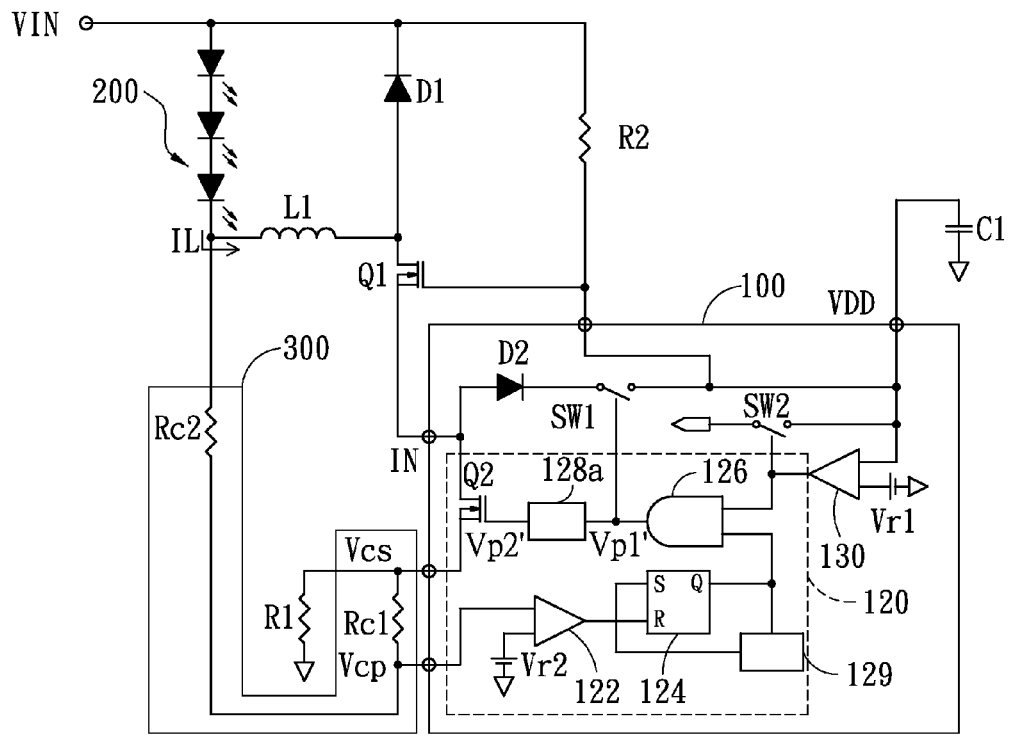
FIG. 21 shows a schematic diagram of an converter according to another embodiment of the present invention.

FIG. 21 shows a circuit diagram of a converter according to an embodiment of the present invention. As described, the present invention uses the voltage-regulating pulse signal Vp1' with earlier timing than the turn-on pulse signal Vp2' for pre-conducting the voltage-regulating switch SW1 before the low-voltage transistor Q2 is turned on, to capture the requisite working power of the conversion control circuit 100. Because there is signal transmission delay when the conversion control circuit 100 controls the low-voltage transistor Q2 according to the feedback voltage signal Vcs, there may be a time delay between the time when the conversion control circuit 100 detects that the voltage level of the feedback voltage signal Vcs is higher than the reference voltage Vr2 and the cut-off time of the pulse of the turn-on pulse signal Vp2'. Within the delay time, the low-voltage transistor Q2 may remain its turn-on status, thus the current IL flowing through the LED lamp string 200 may continuously increase.

Figure 22:
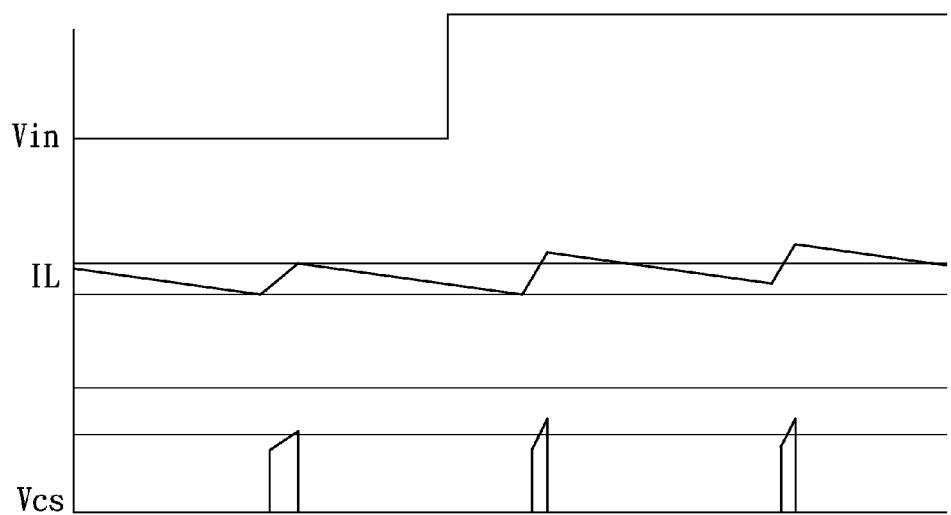
FIG. 22 shows a waveform diagram of an LED current and a feedback voltage signal of a converter in FIG. 21 before being compensated by a compensation circuit.
Figure 23:
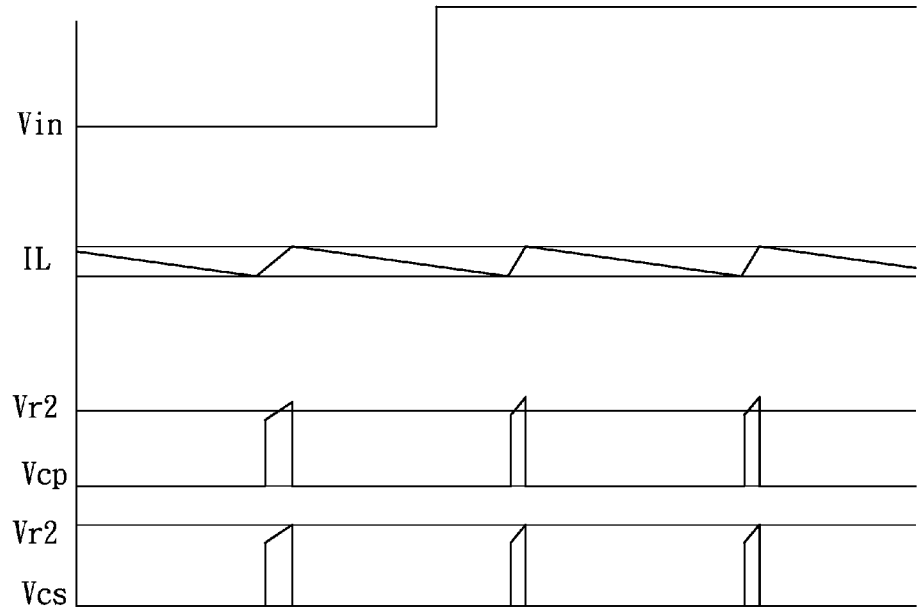
FIG. 23 shows a waveform diagram of an LED current and a feedback voltage signal of a converter in FIG. 21 after being compensated by a compensation circuit.

For compensating the time delay, the conversion in this embodiment has a compensation circuit 300 coupled to the current detection resistor R1, for adjusting the voltage level of the feedback voltage signal Vcs. FIG. 22 shows a waveform diagram of the LED current and feedback voltage signal of the converter in FIG. 21 before being compensated by the compensation circuit. As shown in FIGS. 21 and 22, the compensation circuit 300 has a first resistor Rc1, and a second resistor Rc2 series-connected between the higher voltage end (which is the end for outputting the feedback voltage signal Vcs) of the current detection resistor R1 and the inductor L1. The connection point of the first resistor Rc1 and the second resistor Rc2 outputs a compensation detection signal Vcp, for compensating the signal delay of the turn-on pulse signal Vp2' caused by the delay circuit 128a. Please also refer to FIG. 23, the voltage level of the compensation detection signal Vcp is the voltage level of the feedback voltage signal Vcs added with the voltage division of the first resistor Rc1 and the second resistor Rc2. The magnitude of the voltage division may change along with the input voltage Vin, for making the peak value of the current IL flowing through the LED lamp string 200 remain constant.

Figure 24:
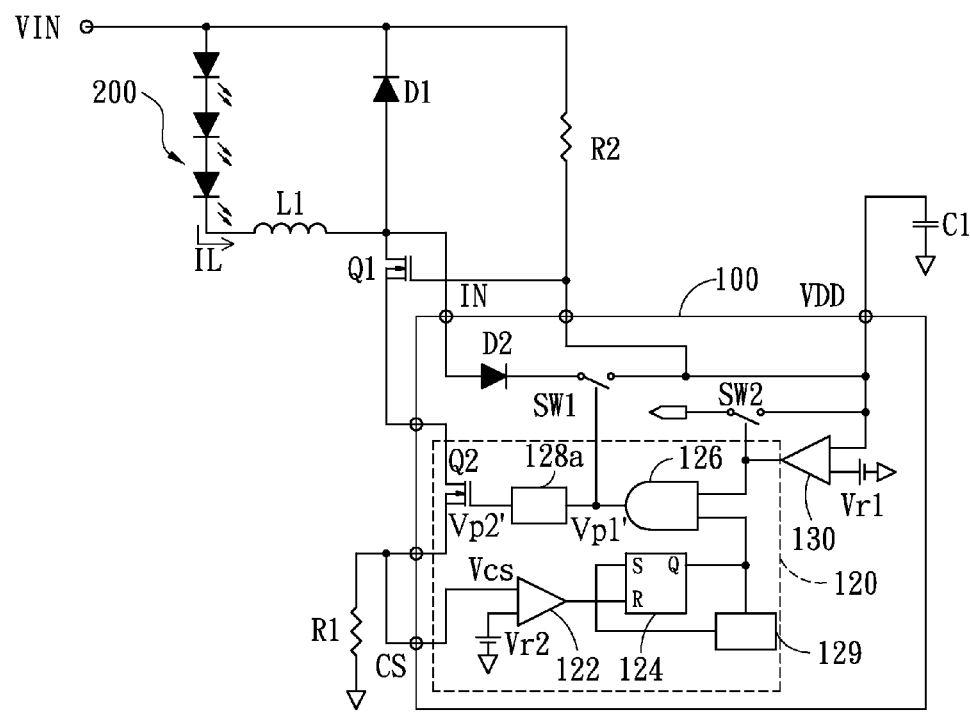
FIG. 24 shows a schematic diagram of an converter according to another embodiment of the present invention.

FIG. 24 shows a schematic diagram of a converter according to another embodiment of the present invention. Comparing with the embodiment in FIG. 15, this embodiment uses the drain of the power transistor Q1 as the external voltage input terminal IN.

Figure 25:
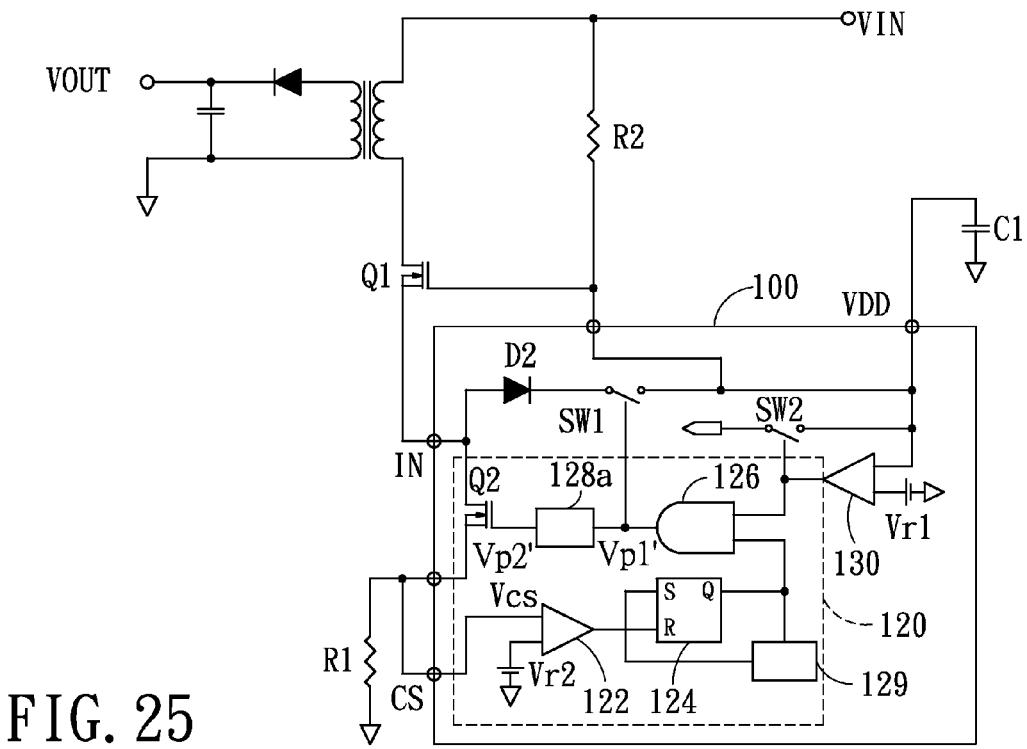
FIG. 25 shows a schematic diagram of an converter according to another embodiment of the present invention.

FIG. 25 shows a schematic diagram of a converter according to another embodiment of the present invention, which is applied to drive the LED lamp string 200. This embodiment applies the techniques to the insolated converter, for converting the input voltage VIN into output voltage VOUT.

Figure 26:
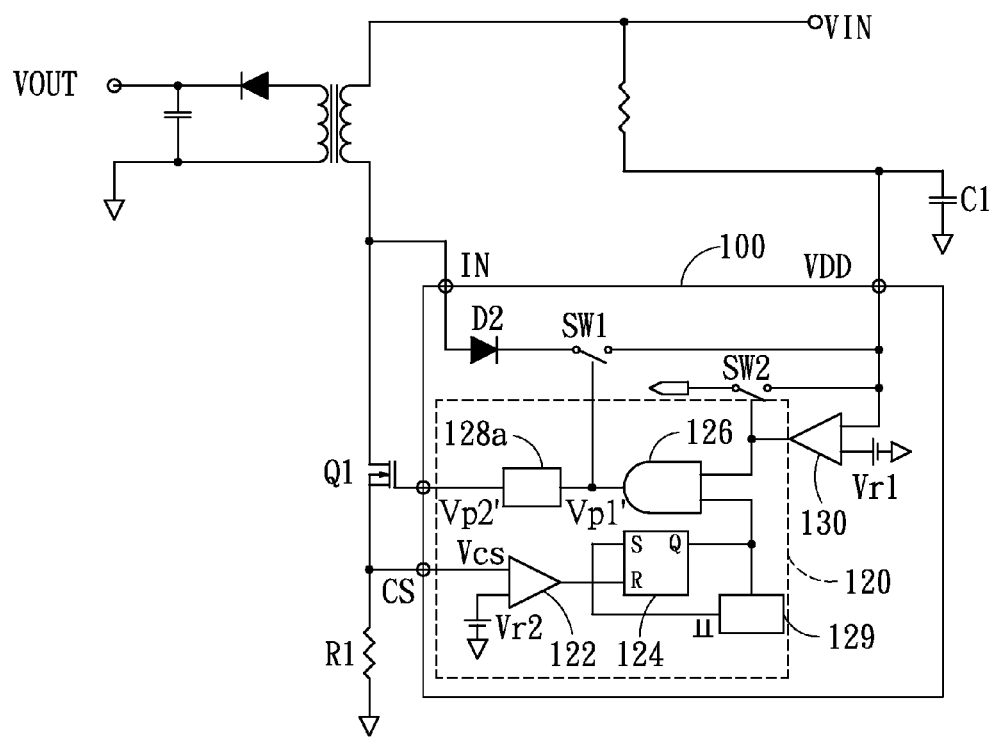
FIG. 26 shows a schematic diagram of an converter according to another embodiment of the present invention.

FIG. 26 shows a schematic diagram of a converter according to another embodiment of the present invention. Comparing with the embodiment of FIG. 25, this embodiment uses the drain of the power transistor Q1 as the external voltage input terminal IN, and omits the low-voltage transistor Q2 and directly uses the turn-on pulse signal Vp2' to control the operation of the power transistor Q1.

The switching voltage-regulating converter and the conversion control circuit of the present invention greatly reduces the power loss during the voltage-regulating for providing requisite working power to the control circuit, which further increases the total conversion efficiency and reduces the temperature of the driving chip.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A conversion control circuit, for controlling operation of a power transistor comprising:
    a voltage-regulating switch, having one end thereof connected to an external voltage input terminal and another end thereof connected to a voltage-regulating capacitor, for converting an input voltage inputted from the external voltage input terminal into a power voltage to supply operating power to the conversion control circuit; and
    a control unit, for generating a voltage-regulating pulse signal and a turn-on pulse signal to control the operations of the voltage-regulating switch and the power transistor, respectively, and for defining a charging period of the voltage-regulating capacitor charged through the external voltage input terminal.

2. The conversion control circuit according to claim 1, wherein a pulse starting time of the voltage-regulating pulse signal is the same or later than a pulse starting time of the turn-on pulse signal, and a starting time of the charging period is the same as or later than a pulse cut-off time of the turn-on pulse signal.

3. The conversion control circuit according to claim 1, wherein a pulse starting time of the voltage-regulating pulse signal is earlier than a pulse starting time of the turn-on pulse signal, and a starting time of the charging period is the same as the pulse starting time of the voltage-regulating pulse signal.

4. The conversion control circuit according to claim 3, wherein a cut-off time of the charging period is the same as the pulse starting time of the turn-on pulse signal.

5. The conversion control circuit according to claim 1, wherein when a voltage value of the power voltage is higher than a predetermined voltage, the input voltage is discharged through a discharging path.

6. The conversion control circuit according to claim 1, further comprising a power voltage detection circuit, coupled to the voltage-regulating capacitor, for detecting a voltage value of the power voltage and for controlling a cut-off time of the charging period according to the voltage-regulating pulse signal.

7. The conversion control circuit according to claim 6, wherein when the voltage value of the power voltage is higher than a predetermined reference voltage value or the voltage-regulating pulse signal is at low voltage level, the power voltage detection circuit outputs a power voltage feedback voltage signal having low voltage level to cut-off the voltage-regulating switch.

8. The conversion control circuit according to claim 1, further comprising a diode, the anode thereof coupled to the external voltage input terminal, the cathode thereof coupled to the voltage-regulating switch, wherein when the power transistor is turned on, the diode becomes reverse-biased and discontinues current from flowing through the voltage-regulating switch.

9. The conversion control circuit according to claim 1, further comprising a low-voltage transistor, series-connected between a source of the power transistor and a ground, wherein the turn-on pulse signal controls the conducting operation of the power transistor by conducting the low-voltage transistor.

10. The conversion control circuit according to claim 1, wherein the control unit includes a delay circuit, for receiving the turn-on pulse signal to generate the voltage-regulating pulse signal.

11. The conversion control circuit according to claim 1, wherein the control unit receives a detection voltage and generates the turn-on pulse signal.

12. A converter, comprising:
    a power transistor, coupled between a light emitting diode (LED) lamp string and a ground; and
    a conversion control circuit, for controlling the operation of the power transistor, comprising:
        a voltage-regulating switch, one end thereof connected to an external voltage input terminal and another end thereof connected to a voltage-regulating capacitor, for converting an input voltage inputted from the external voltage input terminal into a power voltage to supply operating power to the conversion control circuit; and
        a control unit, generating a voltage-regulating pulse signal and a turn-on pulse signal, for respectively controlling the operations of the voltage-regulating switch and the power transistor, and for defining a charging period of the voltage-regulating capacitor which is charged through the external voltage input terminal.

13. The converter according to claim 12, wherein the conversion control circuit further comprises a diode, the anode thereof coupled to the external voltage input terminal, the cathode thereof coupled to.

14. The converter according to claim 12, further comprising a low-voltage transistor series-connected between a source of the power transistor and the ground, wherein the turn-on pulse signal control the conducting operation the power transistor by conducting the low-voltage transistor.

15. The converter according to claim 12, wherein the control unit comprises a delay circuit, for receiving the turn-on pulse signal to generate the voltage-regulating pulse signal.

16. The converter according to claim 12, further comprising a current detection resistor, coupled to the power transistor, for detecting current flowing through the LED lamp string and generating a feedback voltage signal, wherein the control unit generates the turn-on pulse signal according to the feedback voltage signal.

17. The converter according to claim 16, further comprising a compensation circuit, coupled to the current detection resistor, for adjusting a voltage level of the feedback voltage signal to compensate a delay of the turn-on pulse signal caused by the delay circuit.

18. The converter according to claim 17, wherein the compensation circuit comprises a first resistor and a second resistor which are series-connected between the current detection resistor and an inductor, a compensation detection signal having voltage level higher than the feedback voltage signal being outputted at a junction formed between the first resistor and the second resistor, the control unit generating the voltage-regulating pulse signal and the turn-on pulse signal according to the compensation detection signal.

19. The converter according to claim 12, wherein a pulse starting time the voltage-regulating pulse signal is the same as or later than a pulse starting time of the turn-on pulse signal, and a starting time of the charging period is the same as or later than a pulse cut-off time of the turn-on pulse signal.

20. The converter according to claim 12, wherein when a voltage value of the power voltage is higher than a predetermined voltage value, the input voltage is discharged through a discharging path.

21. The converter according to claim 12, further comprising a power voltage detection circuit, coupled to the voltage-regulating capacitor, for detecting a voltage value of the power voltage, and for controlling a cut-off time of the charging period according to the voltage-regulating pulse signal.

22. The converter according to claim 21, wherein when the voltage value of the power voltage is higher than a predetermined reference voltage value or the voltage-regulating pulse signal is at low voltage level, the power voltage detection circuit outputs a power voltage detection signal with low voltage level to cut-off the voltage-regulating switch.

23. The converter according to claim 12, wherein a pulse starting time of the voltage-regulating pulse signal is earlier than a pulse starting time of the turn-on pulse signal, and a starting time of the charging period is the same as the pulse starting time of the voltage-regulating pulse signal.

24. The converter according to claim 23, wherein a cut-off time of the charging period is the same as the pulse starting time of the turn-on pulse signal.

* * * * *